(12) United States Patent
Bates

(10) Patent No.: US 7,546,318 B2
(45) Date of Patent: Jun. 9, 2009

(54) TIME RECORDING AND MANAGEMENT SYSTEM

(75) Inventor: David J. Bates, Waukesha, WI (US)

(73) Assignee: Todd A. Rathe, Mequon, WI (US)

( * ) Notice: Subject to any disclaimer, the term of this patent is extended or adjusted under 35 U.S.C. 154(b) by 531 days.

(21) Appl. No.: 10/763,832

(22) Filed: Jan. 23, 2004

(65) Prior Publication Data

US 2005/0021429 A1 Jan. 27, 2005

Related U.S. Application Data

(60) Provisional application No. 60/442,145, filed on Jan. 23, 2003.

(51) Int. Cl.
G06F 17/30 (2006.01)
(52) U.S. Cl. ............... 707/200; 707/100; 707/102; 707/104.1
(58) Field of Classification Search ...... 707/100–104.1, 707/103 R–103 Z, 200; 705/32
See application file for complete search history.

(56) References Cited

U.S. PATENT DOCUMENTS 6,401,079 B1 * 6/2002 Kahn et al. .................... 705/30
2004/0019542 A1 * 1/2004 Fuchs et al. ................... 705/32

* cited by examiner

*Primary Examiner*—Cheryl Lewis
(74) *Attorney, Agent, or Firm*—Rathe Patent & IP Law

(57) ABSTRACT

A time entry recording and management system includes a plurality of fields, a selector and an actuator. The plurality of fields includes a date field configured to display a date, a start field configured to display a starting time of a time entry, a stop field configured to display an ending time of the time entry, a description field configured to display a description of the time entry, and at least one code or designation field configured to display a code or designation assigned to the time entry. The selector is movable between at least two of the plurality of fields. The actuator is configured to perform at least one of a plurality of functions upon being actuated depending upon in which of the plurality of fields the selector is located. The actuator is also configured to fill in at least two of the fields upon being actuated once in some instances.

18 Claims, 18 Drawing Sheets

Daily Timesheet for TAR

| Hours: | Bill | Nonbill | Local | Nat | Local | Nat |
|---|---|---|---|---|---|---|
| Target | 1700 | 150 | $3,382 | $3,844 | $330 | $375 |
| So Far | 1568.9 | 322.6 | | Total | Client | Matter Num |
| To Go | 131.7 | -172.6 | | 102 | 84061 | 341 |
| Today: | 7.1 | | | | | |

| | | Projected Billable Hours Using 365 Working Days: | 1684 | TAR |
| | | Projected Billable Hours Using Actual/Anticipated Working Days: | 1695 | |
| | | Average Daily Pace So Far Using Actual Working Days: | 6.67 | |
| | | Average Daily Pace Needed Using Anticipated Working Days: | | |

| Date | Start | Stop | Hours | Client | Matter Num | Description | B | NB | T |
|---|---|---|---|---|---|---|---|---|---|
| 1/6/03 | | | | | | | | | |
| | 9:38 AM | 10:40 AM | 0.20 | 16646 | 127 | Review & report published patent application | 0.20 | -- | 0.2 |
| | 3:24 PM | 4:12 PM | 1.02 | 27830 | 3577 | Draft Reply instructions | 1.02 | -- | 1.1 |
| | | | 0.80 | 68492 | 101 | Review Closing assignment; confer w/ J. Smith re: docket records; confer w/ J. Jones; Confer w/ J. Johnson re: recordation of assignments | 0.80 | -- | 0.8 |
| | 4:15 PM | 6:38 PM | 2.38 | 84061 | 341 | draft application | 2.38 | -- | 2.4 |
| | 10:59 AM | 11:29 AM | 0.49 | 84061 | 342 | | 0.49 | | |
| | 1:04 PM | 2:28 PM | 1.40 | 84061 | 342 | draft application | 1.40 | | |
| | 2:40 PM | 3:23 PM | 0.71 | 84061 | 342 | | 0.71 | | 2.6 |
| | | | 0.20 | firm | adm | Confer w/ J. Doe re: billing issue for XYZ Corp | -- | 0.20 | 0.2 |
| | | | | | | | 7.10 | 0.20 | 7.3 |

FIG. 7

| | A | B | C | D | E | F | G | H | I | J | K | L | M | N | O |
|---|---|---|---|---|---|---|---|---|---|---|---|---|---|---|---|
| 1 | Hours: | | Daily Totals | | | | | Cum. Bill Hours | Cum. N-Bill Hours | Foley Projected | Req. Daily Billable Avg. | My Projected Hours | | | Target Monthly Avg. |
| 2 | Target | | | | | | | | | | | | | Hours | |
| 3 | Day | Date | Billable | Nonbillable | | | | | | | | | Month | | |
| 4 | 1 | 02/01/02 | 6.3 | 0.7 | | | | 6.3 | 0.7 | 2299.5 | 6.67 | 1600.2 | February | 137.0 | 162.5 |
| 5 | 2 | 02/02/02 | | | | | | 6.3 | 0.7 | 1149.8 | 6.69 | 1600.2 | March | - | 162.5 |
| 6 | 3 | 02/03/02 | | | | | | 6.3 | 0.7 | 766.5 | 6.69 | 1600.2 | April | 187.5 | 162.5 |
| 7 | 4 | 02/04/02 | 6.1 | 0.6 | | | | 12.4 | 1.3 | 1131.5 | 6.67 | 1574.8 | May | 146.7 | 162.5 |
| 8 | 5 | 02/05/02 | 6.0 | 0.0 | | | | 18.4 | 1.3 | 1343.2 | 6.67 | 1557.9 | June | 126.8 | 162.5 |
| 9 | 6 | 02/06/02 | 9.3 | 0.0 | 7.3 | avg. | | 27.7 | 1.3 | 1685.1 | 6.66 | 1759.0 | July | 193.0 | 162.5 |
| 10 | 7 | 02/07/02 | 6.7 | 0.0 | 36.3 | total billable | | 34.4 | 1.3 | 1793.7 | 6.66 | 1747.5 | August | 201.8 | 162.5 |
| 11 | 8 | 02/08/02 | 8.2 | 0.2 | 0.8 | total nonbillable | | 42.6 | 1.5 | 1943.6 | 6.66 | 1803.4 | September | 111.8 | 162.5 |
| 12 | 9 | 02/09/02 | | | | | | 42.6 | 1.5 | 1727.7 | 6.68 | 1803.4 | October | 114.6 | 162.5 |
| 13 | 10 | 02/10/02 | | | | | | 42.6 | 1.5 | 1554.9 | 6.68 | 1803.4 | November | 110.0 | 162.5 |
| 14 | 11 | 02/11/02 | 7.5 | 0.0 | 6.9 | avg. | | 50.1 | 1.5 | 1662.4 | 6.65 | 1817.9 | December | 102.9 | 162.5 |
| 15 | 12 | 02/12/02 | 6.9 | 0.0 | 34.7 | total billable | | 57.0 | 1.5 | 1733.8 | 6.65 | 1809.8 | January | 19.7 | 162.5 |
| 16 | 13 | 02/13/02 | 6.1 | 0.0 | 0.5 | total nonbillable | | 63.1 | 1.5 | 1771.7 | 6.65 | 1780.8 | | | |
| 17 | 14 | 02/14/02 | 5.0 | 0.5 | | | | 68.1 | 2.0 | 1775.5 | 6.66 | 1729.7 | TOTAL | 1,451.8 | 1,950.0 |
| 18 | 15 | 02/15/02 | 9.2 | 0.0 | | | | 77.3 | 2.0 | 1801.0 | 6.65 | 1784.9 | | | |
| 19 | 16 | 02/16/02 | | | | | | 77.3 | 2.0 | 1763.4 | 6.66 | 1784.9 | Target: | 1950 | |
| 20 | 17 | 02/17/02 | | | | | | 77.3 | 2.0 | 1659.7 | 6.68 | 1784.9 | | | |
| 21 | 18 | 02/18/02 | 7.7 | 0.2 | | | | 85.0 | 2.2 | 1723.6 | 6.65 | 1799.2 | | | |
| 22 | 19 | 02/19/02 | 7.3 | 0.0 | 7.1 | avg. | | 92.3 | 2.2 | 1773.1 | 6.64 | 1803.4 | New Users: | Type in the number of h | |
| 23 | 20 | 02/20/02 | 7.2 | 1.5 | 35.3 | total billable | | 99.5 | 3.7 | 1815.9 | 6.64 | 1805.2 | | in columns C and D as | |
| 24 | 21 | 02/21/02 | 6.8 | 2.2 | 4.2 | total nonbillable | | 106.3 | 5.9 | 1847.6 | 6.64 | 1800.0 | | Your monthly hours will | |
| 25 | 22 | 02/22/02 | 6.3 | 0.3 | | | | 112.6 | 6.2 | 1866.1 | 6.64 | 1787.5 | | these numbers will go t | |
| 26 | 23 | 02/23/02 | | | | | | 112.6 | 6.2 | 1786.9 | 6.67 | 1787.5 | | Pace" number. | |
| 27 | 24 | 02/24/02 | | | | | | 112.6 | 6.2 | 1712.5 | 6.67 | 1787.5 | | | |
| 28 | 25 | 02/25/02 | 7.5 | 0.0 | | | | 120.1 | 6.2 | 1753.5 | 6.64 | 1794.4 | | | |
| 29 | 26 | 02/26/02 | 7.3 | 0.6 | | | | 127.4 | 6.8 | 1786.5 | 6.64 | 1797.8 | | | |
| 30 | 27 | 02/27/02 | 6.0 | 1.4 | 5.7 | avg. | | 133.4 | 8.2 | 1803.4 | 6.64 | 1803.4 | | | |
| 31 | 28 | 02/28/02 | 3.6 | 1.1 | 28.3 | total billable | | 137.0 | 9.3 | 1785.9 | 6.65 | 1739.9 | | | |
| 32 | 29 | 03/01/02 | 3.9 | 1.9 | 5.0 | total nonbillable | | 140.9 | 11.2 | 1773.4 | 6.66 | 1704.2 | | | |
| 33 | 30 | 03/02/02 | | | | | | 140.9 | 11.2 | 1714.3 | 6.69 | 1704.2 | | | |

| | A | B | C | D | E | F | G | H | I | J | K | L |
|---|---|---|---|---|---|---|---|---|---|---|---|---|
| 337 | 334 | 12/31/02 | 6.2 | 0.0 | | | | 1548.6 | 323.0 | 1692.3 | 6.31 | 1702.8 |
| 338 | 335 | 01/01/03 | | | 5.9 | avg. | | 1548.6 | 323.0 | 1687.3 | 6.58 | 1695.5 |
| 339 | 336 | 01/02/03 | 6.3 | 0.0 | 23.5 | total billable | | 1554.9 | 323.0 | 1689.1 | 6.60 | 1695.0 |
| 340 | 337 | 01/03/03 | 6.3 | 0.0 | 0.0 | total nonbillable | | 1561.2 | 323.0 | 1690.9 | 6.61 | 1694.6 |
| 341 | 338 | 01/04/03 | | | | | | 1561.2 | 323.0 | 1685.9 | 6.94 | 1694.6 |
| 342 | 339 | 01/05/03 | | | | | | 1561.2 | 323.0 | 1680.9 | 6.94 | 1694.6 |
| 343 | 340 | 01/06/03 | 7.1 | 0.2 | | | | 1568.3 | 323.2 | 1683.6 | 6.59 | 1695.1 |
| 344 | 341 | 01/07/03 | | | | | | 1568.3 | 323.2 | 1678.7 | 6.93 | 1687.9 |
| 345 | 342 | 01/08/03 | | | 7.1 | avg. | | 1568.3 | 323.2 | 1673.8 | 7.32 | 1680.8 |
| 346 | 343 | 01/09/03 | | | 7.1 | total billable | | 1568.3 | 323.2 | 1668.9 | 7.75 | 1673.7 |
| 347 | 344 | 01/10/03 | | | 0.2 | total nonbillable | | 1568.3 | 323.2 | 1664.0 | 8.23 | 1666.7 |
| 348 | 345 | 01/11/03 | | | | | | 1568.3 | 323.2 | 1659.2 | 8.78 | 1666.7 |
| 349 | 346 | 01/12/03 | | | | | | 1568.3 | 323.2 | 1654.4 | 8.78 | 1666.7 |
| 350 | 347 | 01/13/03 | | | | | | 1568.3 | 323.2 | 1649.7 | 8.78 | 1659.8 |
| 351 | 348 | 01/14/03 | | | | | | 1568.3 | 323.2 | 1644.9 | 9.41 | 1652.9 |
| 352 | 349 | 01/15/03 | | | #DIV/0! | avg. | | 1568.3 | 323.2 | 1640.2 | 10.13 | 1646.1 |
| 353 | 350 | 01/16/03 | | | 0.0 | total billable | | 1568.3 | 323.2 | 1635.5 | 10.98 | 1639.3 |
| 354 | 351 | 01/17/03 | | | 0.0 | total nonbillable | | 1568.3 | 323.2 | 1630.9 | 11.97 | 1632.6 |
| 355 | 352 | 01/18/03 | | | | | | 1568.3 | 323.2 | 1626.2 | 13.17 | 1632.6 |
| 356 | 353 | 01/19/03 | | | | | | 1568.3 | 323.2 | 1621.6 | 13.17 | 1625.9 |
| 357 | 354 | 01/20/03 | | | | | | 1568.3 | 323.2 | 1617.0 | 13.17 | 1619.3 |
| 358 | 355 | 01/21/03 | | | | | | 1568.3 | 323.2 | 1612.5 | 14.63 | 1612.7 |
| 359 | 356 | 01/22/03 | | | #DIV/0! | avg. | | 1568.3 | 323.2 | 1607.9 | 16.46 | 1606.2 |
| 360 | 357 | 01/23/03 | | | 0.0 | total billable | | 1568.3 | 323.2 | 1603.4 | 18.81 | 1599.8 |
| 361 | 358 | 01/24/03 | | | 0.0 | total nonbillable | | 1568.3 | 323.2 | 1599.0 | 21.95 | 1599.8 |
| 362 | 359 | 01/25/03 | | | | | | 1568.3 | 323.2 | 1594.5 | 26.34 | 1599.8 |
| 363 | 360 | 01/26/03 | | | | | | 1568.3 | 323.2 | 1590.1 | 26.34 | 1593.4 |
| 364 | 361 | 01/27/03 | | | | | | 1568.3 | 323.2 | 1585.7 | 26.34 | 1587.0 |
| 365 | 362 | 01/28/03 | | | | | | 1568.3 | 323.2 | 1581.3 | 32.93 | 1580.7 |
| 366 | 363 | 01/29/03 | | | #DIV/0! | avg. | | 1568.3 | 323.2 | 1576.9 | 43.90 | 1574.5 |
| 367 | 364 | 01/30/03 | | | 0.0 | total billable | | 1568.3 | 323.2 | 1572.6 | 65.85 | 1568.3 |
| 368 | 365 | 01/31/03 | | | 0.0 | total nonbillable | | 1568.3 | 323.2 | 1568.3 | 131.70 | |

FIG. 10

| | S | T | U | V | W | X | Y | Z |
|---|---|---|---|---|---|---|---|---|
| 337 | New Year's | Tue | 12/31/02 | 1 | 24 | 231 | 12/31/02 | 1692.3 |
| 338 | New Year's | Wed | 01/01/03 | 1 | 23 | 232 | 01/01/03 | 1687.3 |
| 339 | | Thu | 01/02/03 | 1 | 22 | 233 | 01/02/03 | 1689.1 |
| 340 | | Fri | 01/03/03 | 1 | 21 | 234 | 01/03/03 | 1690.9 |
| 341 | | Sat | 01/04/03 | 0 | 20 | 234 | 01/04/03 | 1685.9 |
| 342 | | Sun | 01/05/03 | 0 | 20 | 234 | 01/05/03 | 1680.9 |
| 343 | | Mon | 01/06/03 | 1 | 20 | 235 | 01/06/03 | 1683.6 |
| 344 | | Tue | 01/07/03 | 1 | 19 | 236 | 01/07/03 | 1678.7 |
| 345 | | Wed | 01/08/03 | 1 | 18 | 237 | 01/08/03 | 1673.8 |
| 346 | | Thu | 01/09/03 | 1 | 17 | 238 | 01/09/03 | 1668.9 |
| 347 | | Fri | 01/10/03 | 1 | 16 | 239 | 01/10/03 | 1664.0 |
| 348 | | Sat | 01/11/03 | 0 | 15 | 239 | 01/11/03 | 1659.2 |
| 349 | | Sun | 01/12/03 | 0 | 15 | 239 | 01/12/03 | 1654.4 |
| 350 | | Mon | 01/13/03 | 1 | 15 | 240 | 01/13/03 | 1649.7 |
| 351 | | Tue | 01/14/03 | 1 | 14 | 241 | 01/14/03 | 1644.9 |
| 352 | | Wed | 01/15/03 | 1 | 13 | 242 | 01/15/03 | 1640.2 |
| 353 | | Thu | 01/16/03 | 1 | 12 | 243 | 01/16/03 | 1635.5 |
| 354 | | Fri | 01/17/03 | 1 | 11 | 244 | 01/17/03 | 1630.9 |
| 355 | | Sat | 01/18/03 | 0 | 10 | 244 | 01/18/03 | 1626.2 |
| 356 | | Sun | 01/19/03 | 0 | 10 | 244 | 01/19/03 | 1621.6 |
| 357 | | Mon | 01/20/03 | 1 | 10 | 245 | 01/20/03 | 1617.0 |
| 358 | | Tue | 01/21/03 | 1 | 9 | 246 | 01/21/03 | 1612.5 |
| 359 | | Wed | 01/22/03 | 1 | 8 | 247 | 01/22/03 | 1607.9 |
| 360 | | Thu | 01/23/03 | 1 | 7 | 248 | 01/23/03 | 1603.4 |
| 361 | | Fri | 01/24/03 | 1 | 6 | 249 | 01/24/03 | 1599.0 |
| 362 | | Sat | 01/25/03 | 0 | 5 | 249 | 01/25/03 | 1594.5 |
| 363 | | Sun | 01/26/03 | 0 | 5 | 249 | 01/26/03 | 1590.1 |
| 364 | | Mon | 01/27/03 | 1 | 5 | 250 | 01/27/03 | 1585.7 |
| 365 | | Tue | 01/28/03 | 1 | 4 | 251 | 01/28/03 | 1581.3 |
| 366 | | Wed | 01/29/03 | 1 | 3 | 252 | 01/29/03 | 1576.9 |
| 367 | | Thu | 01/30/03 | 1 | 2 | 253 | 01/30/03 | 1572.6 |
| 368 | | Fri | 01/31/03 | 1 | 1 | 254 | 01/31/03 | 1568.3 |

TIME RECORDING AND MANAGEMENT SYSTEM

CROSS-REFERENCE TO RELATED APPLICATIONS

The present application claims priority under 35 U.S.C. § 119(e) from co-pending U.S. provisional application Ser. No. 60/442,145 filed on Jan. 23, 2003, the full disclosure of which is hereby incorporated by reference.

FIELD OF THE INVENTION

The present invention generally relates to systems and methods for recording, managing and reporting time entries.

BACKGROUND OF THE INVENTION

Time is generally recorded, managed and reported in a variety of circumstances. The effective tracking of time is critical to particular professions when compensations and charges are based upon the amount of time expended to provide a service or complete a project. Examples of professions where time keeping is important include attorneys, doctors and the like. Tracking time is also important for allocating project costs and meeting project completion deadlines. The time information recorded is also useful for budgeting future projects or services.

A variety of time tracking or management systems are currently available. Such systems come in a variety of different formats. For example, in one known application, time is recorded by clicking a button of a mouse or a key of a computer keyboard upon commencement of an activity, and clicking once again at the end of the particular activity. The system automatically calculates the duration of time spent in the activity. The start time, the end time and the duration are all presented in a row of fields on a computer screen. Additional fields state the date of the time entries. In addition, blank fields are displayed in the same row as the time entries for recording client, activity, reference, and comment for the particular time entry.

In a completely separate screen or window, the user may obtain summary information. In particular, the user is prompted to enter a start date and an end date for the summary, as well as summary criteria (either a client, activity or reference, or combinations thereof). Once this information is entered, the system calculates and displays the total time entered during the time period of each particular client, each activity of each client, and each reference of each activity of each client, depending upon the summary criteria chosen. The system further calculates and displays a total time for the particular time period and a percentage of the total time that is entered for each client, client and activity, or client and activity and reference category. It displays time in hours and minutes or hours with decimals. The system is also configured to round time up or down or to the nearest minute interval.

The system provides a pull-down menu for creating project identity icons (client, activity, reference) which are depicted in a toolbar at the top of the screen. When such project identities are created, the user may click on one of the identities at commencement of an activity which causes both the start time and the project identity to be simultaneously entered as a new entry or row. Several other time tracking or timekeeping systems are also available which track time in a similar fashion.

Although such systems are quite common, procedures for recording, tracking and displaying time are somewhat awkward and tedious to use. Moreover, the amount of time information provided by such systems are generally inadequate under many circumstances. As a result, there is a continuing need for a time recording and management system that is simpler to use and that provides more useful information to assist in the management and tracking of time.

SUMMARY OF THE INVENTION

The present invention relates to an present invention generally relates to systems and methods for recording, managing and reporting time entries.

According to a first aspect of an embodiment of the present invention, a time recording and management system comprises a plurality of fields. The plurality of fields includes a date field, a start field, a stop field, a description field, and at least one code field. The date field is configured to display a date. The start field is configured to display a starting time of a time entry. The stop field is configured to display an ending time of the time entry. The description field configured to display a description of the time entry. The at least one code field is configured to display at least one code assigned to the time entry. The time system further includes a selector movable between each of the plurality of fields and an actuator. The actuator is configured to perform at least one of a plurality of functions upon being actuated depending upon in which of a plurality of fields the selector is located.

According to a further aspect of an embodiment of the present invention, a method is provided method for recording and managing time. The method comprises providing a plurality of fields including a date field configured to display a date, a start field configured to display an starting time of a time entry, a stop field configured to display an ending time of the time entry, a description field configured to display a description of the time entry and at least one designation field configured to display at least one designation assigned to the time entry. The method further comprises moving a selector between each of the plurality of fields, and performing at least one of a plurality functions based upon which of the plurality of fields the selector is located and in response to actuation of an actuator.

According to yet another aspect of an embodiment of the present invention, a time recording and management system comprises a plurality of fields configured to display time related information. The time system further comprises means for selecting a first one of the plurality of fields, and means for entering time related information in a second one of the plurality of fields based upon the selected first one of the plurality of fields and in response to actuation of an actuator.

According to a different aspect of an embodiment of the present invention, a time recording and management system comprises a plurality of fields configured to display different types of time entry data. The system further comprises a selector movable between each of the plurality of fields, and a first actuator. The first actuator is configured to perform at least one of a plurality of functions upon being actuated depending upon in which of a plurality of fields the selector is located.

According to another aspect of an embodiment of the present invention, a time recording and management system comprises a plurality of fields configured to display different types of time entry data. The system further comprises a selector movable between each of the plurality of fields, and a first actuator configured to automatically fill data in at least two of the fields upon being actuated once.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

FIGS. 1-6 are screen shots of a time recording and management system in accordance with an embodiment of the present invention.

FIG. 7 is a printout of a report generated by the time recording and management system of FIGS. 1-6.

FIGS. 8-18 are additional screen shots of the time recording and management system of FIGS. 1-6.

DETAILED DESCRIPTION OF THE PREFERRED EMBODIMENTS

FIGS. 1-6 and 8-14 are screen shots of a time recording and management system 10. System 10 generally comprises a computer system allowing the entry of time data, the recordation of time data, and the calculation of follow-up data using the entered time data. System 10 is configured to assist the user to record and manage time. System 10 is especially advantageous for professionals and other individuals who must charge customers or clients for services performed on an hourly basis. System 10 assists such individuals in establishing and meeting hourly goals and in tracking charges to assure that cost estimates and budgets are met.

In the particular embodiment illustrated, system 10 is created on a conventionally known MICROSOFT® Excel spreadsheet program. In alternative embodiments, system 10 may be formed in other conventionally known or future developed spreadsheet programs or may be formed with other conventionally known or future developed software or hardware componentry, not necessarily a spreadsheet program. For example, system 10 may be a standalone software program written in any well known programming language such as C+, Visual Basic, Pascal and the like.

System 10 generally includes several pages (or screens) including an intro page 12, a daily timesheet page 14, a planning page 16, project tracker 18, and a plurality of historical planning pages 20. In the particular embodiment illustrated, each of pages 12, 14, 16, 18 and 20 are identified at the lower end of the screen with tabs as is conventionally known in the MICROSOFT Excel spreadsheet program in which system 10 is embodied. In alternative embodiments, such pages may be accessed by activating icons located in one or more toolbars or menus. In still other embodiments, pages 12, 16, 18 and 20 may be omitted. Page 12 generally comprises an introduction page providing general information about the use of system 10.

Figure 1:
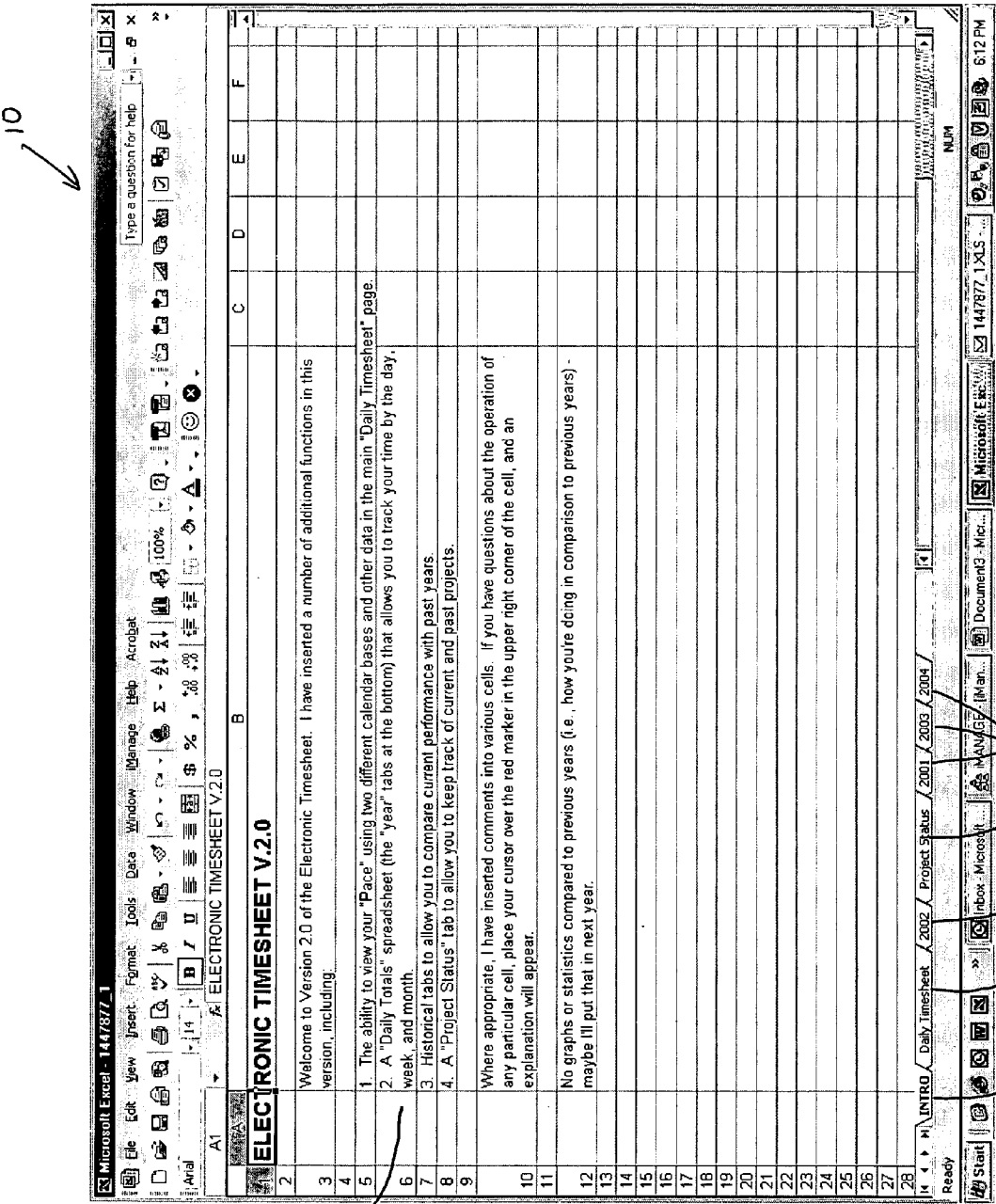
Figure 2:
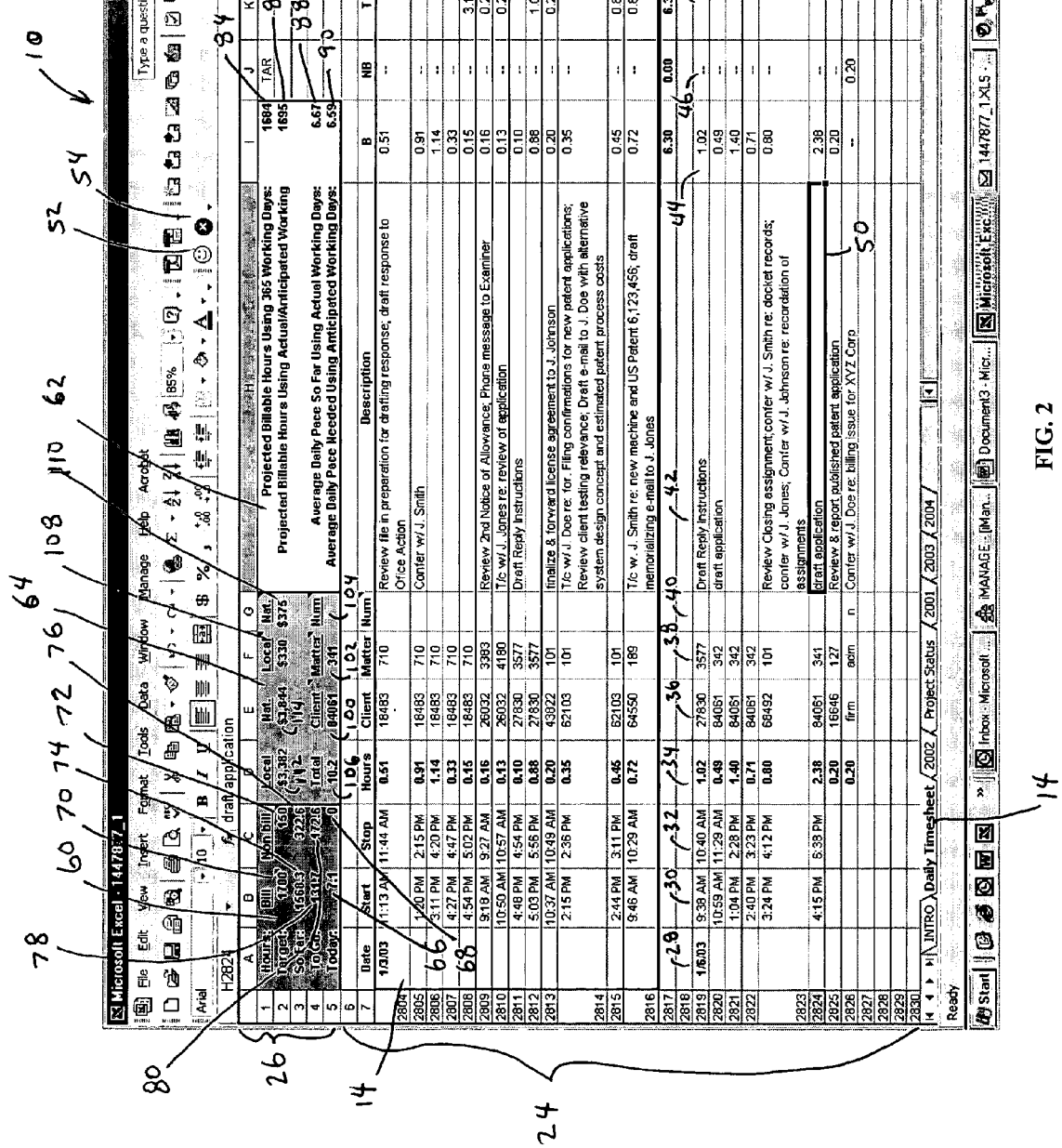

FIG. 2 is a screen shot of daily timesheet page 14 which displays time entries over a span of several days. Daily timesheet page 14 includes a plurality of fields that are simultaneously displayed and that are subdivided into two zones: a daily record zone 24 and a status zone 26. Daily record zone 24 includes fields configured to display daily time information. Zone 24 generally includes various headings (shown in row 7) which along with zone 26 are fixed in nature and are continuously displayed on page 14. Below the headings in row 7, zone 24 includes date fields 28 (shown in column A), start fields 30 (shown in column B), stop fields 32 (shown in column C), entry hours fields 34 (shown in column D), genus code field 36, species code field 38, and sub-species field 40 (shown in columns E, F and G, respectively), description field 42, filtering fields 44, 46 (shown in columns I and J, respectively), and activity tally field 48 (shown in column K). As further shown by FIG. 2, system 10 includes a selector 50 and actuators 52 and 54 (activating icons provided as part of the toolbar).

Date field 28 is configured to display date information. The start field is configured to display a starting time of a time entry while stop field 32 is configured to display an ending time of a time entry. A time entry is an uninterrupted period of time during which a single activity occurs. The entry hours or elapsed time field 34 is configured to display an elapsed time between a corresponding start time and a corresponding stop time as recorded in the corresponding start field and stop field. Preferably, system 10 automatically calculates elapsed time which is displayed in field 34. Alternatively, the value displayed in field 34 can be manually overwritten by positioning locator 50 in the particular field 34 and by manually entering the time through an input such as a keyboard or key pad of a computer, PDA, voice recognition software and the like.

Code fields 36, 38 and 40 are configured to display codes assigned to a corresponding time entry. In the particular embodiment illustrated, the system provides three such code fields enabling genus, species and sub-species code information to be recorded. For example, in the illustrated embodiment, genus code field 36 is configured to display a general client identification indicia consisting of one or more alphanumeric symbols. Species code field 38 is configured to display particular projects or matters being performed for the particular client or customer. Sub-species code field 40 is configured to display information or entries identifying either the nature of the activity or information relating to what segment or portion of the activity is being performed. For example, a particular client (identified by the information displayed in field 36) may have a project or matter (identified by the information displayed in field 38) that may span several years and that may include several measurable segments or portions. System 10 enables such sections, portions or segments to be tracked individually by assigning each section or portion a distinct value which is displayed in field 40. Alternatively, information entered and displayed in field 40 may also distinguish between matters having distinct characteristics such as those matters that are billed and those matters that are not billed. In other applications, information may be entered and displayed in code field 40 separating out such activity for special treatment, such as pre-negotiated reduced billing rates, contingency billing and the like. Although less desirable, system 10 may be modified to include a fewer or greater number of code fields for each activity or entry (shown as a row).

In the particular embodiment illustrated, input of the letter "n" or "N" in sub-species field 40 designates the time entry as relating to an activity that is not billable. Any other entry designates the corresponding time entry as billable. Numerical values may be entered into and displayed by sub-species field 40 to designate the corresponding time entries to designate particular portions or segments of a project or activity represented by a particular time entry.

Description fields 42 are generally configured to display a description or comment describing or otherwise characterizing the activity of the particular time entry.

Fields 44 and 46 are configured to display data depending upon a designated characteristic of the data. In the illustrated embodiment, field 44 displays the same data displayed in a corresponding field 34 if the matter or activity is billable (i.e., a corresponding empty sub-species field 40 or any alphanumeric symbol other than "n" or "N"). Field 46 is configured to display the corresponding data displayed in field 34 if the corresponding sub-species field 40 is displaying the letter "n"

or "N" designating that time value as nonbillable. Thus, fields 44 and 46 parse out or separate the data displayed in field 34 into two columns depending upon the billable or nonbillable nature of the time entry. This facilitates the summing of hourly totals for the day in each of the two types of time entries. In the particular embodiment illustrated, fields 44 and 46 display such parsed out data in response to the time entries for the particular date being updated or closed upon activation of actuator 54 as will be described in greater detail hereafter.

Activity tally field 48 is generally configured to display the total of all time entries for a particular date for an identical activity as identified by identical values displayed in all three code fields. For example, an individual may record multiple time entries for the same project in a single day. Field 48 displays the sum of all the individual identical time entries for that particular activity for the given day. In the particular embodiment illustrated, field 48 is only populated with values when a day is closed in response to activation of actuator 54 as will be described in greater detail hereafter.

In the particular example illustrated in FIG. 2, eight time entries are depicted in rows 2819-2826. The first time entry for the day has date information of Jan. 6, 2003 displayed in the date field (A2819). The first time entry indicates that an activity began at 9:28 a.m. and terminated at 10:40 a.m. System 10 calculated an elapsed time of 1.02 hours which is depicted in the elapsed time field 34 for the time entry in row 2819. The code fields 36, 38 and 40 in row 2819 indicate that the activity was performed for a client assigned a genus identification number 27830 along with a matter or project identified with a species alphanumeric number 3577. The sub-species field 40 (column G) indicates that this matter is billable. Individual records for segments of this matter are not being kept as indicated by the omission of any numbers or non-"N" alphanumeric symbols. The time entry is described in the description field 42 as "Drafting reply instructions." As reflected in fields 44 and 46, the time entries for the day have been updated by activation of actuator 52, wherein the 1.02 hours displayed in the elapsed time field 34 have been copied to field 44 based on the billable nature of the activity. The time entry entered in row 2825 omits a start time or a stop time value in fields 30 and 32, respectively. However, the particular elapsed time for the activity has been manually entered into the elapsed time field 34 as 0.20 hours. Similarly, the time entry in row 2826 also includes a manually entered elapsed time value in field 34. However, as evidenced by neither of fields 44 or 46 containing data, the time entries for the date have not been updated by activation of actuator 54 since the creation of the time entry in row 2826.

Selector 50 generally comprises a conventionally known means in the Excel spreadsheet for moving about the spreadsheet and selecting a particular cell. The selection of the cell by selector 50 is identified by highlighting the selected cell or by surrounding the selected cell by a darkened bold line as shown in FIG. 2. In particular, a cursor may be moved around by moving a mouse, depressing arrow keys on a keyboard input, or moved in other conventionally known manners commonly employed on computers, laptops, notebooks and the like to a desired location. Once the cursor is in the desired location, the particular cell can be selected by depressing a button on a mouse, on a keyboard or other conventionally known or future developed means.

Entry and recording of data in daily record zone 24 is simplified and facilitated by actuator 52. In particular, actuator 52 is configured to perform a plurality of different functions upon being actuated or activated depending upon which of the plurality of cells or fields the selector is located. Details of the particular code which is executed when actuator 52 is clicked is provided in Appendix A attached hereto. When selector 50 is located in a date field 28, actuation of actuator 52 will cause actuator 52 to enter a current date in a date field spaced from a previous day's entries by a predetermined amount of rows. If a date field already contains the current date, however, then no acts will be taken and the user will be notified that the date has already been entered. In the particular embodiment, activation of the actuator 52 will also simultaneously cause the current time to be entered in a start field 30 that corresponds to the date field 28 in which the current date was entered by actuator 52. In one embodiment, actuator 52 will also enter the current time plus a preselected time increment in a stop field 32 corresponding to the date field in which selector 50 is located upon activation of actuator 52. In one embodiment, activation of actuator 52 while selector 50 is in date field 28 will also cause actuator 52 to move selector 50 to the stop field 32 corresponding to the date field 28. As a result, by simply moving selector 50 to a date field at the beginning of the day and then moving a cursor to the icon of actuator 52 and activating actuator 52 (by simply pressing a button), the user can quickly and efficiently begin a day's time entries. The current date is automatically entered, the current start time is automatically entered, and the selector 50 is automatically moved to the stop field, wherein subsequent activation of actuator 52 will automatically cause the current stop time to be entered in the stop field.

While entry of many of the values or data in the various fields is automated per the use of actuator 52, each of the entries may also be manually entered by locating selector 50 in a particular cell and by manually typing or inputting data through an input such as a keyboard, key pad, electronic writing tool, speech recognition software and the like.

When selector 50 is positioned in an empty start time field 30, activation of actuator 52 will result in the current system time being automatically entered into the start field. In addition, the current time plus a preselected time increment will be automatically entered into the corresponding stop field 32. In the preferred embodiment, selector 50 will also be moved to the stop field 32. When selector 50 is positioned in a start field 30 that contains data, activation of the actuator will cause actuator 52 toggle between recording a preceding stop time from a preceding time entry (i.e., the next preceding row in a day) in the start time field in which selector 50 is located and the current system time. This function is beneficial in that it enables the user to quickly and easily retroactively enter the starting time of an activity in the start time field. For example, upon cessation of the first activity, the user may immediately begin working on a second activity (whether or not the same matter). However, if the user forgets to either enter his or her start time in the next start field 30 or forgets to move selector 50 to the next open start field 50 and actuate actuator 52, the user can correct this deficiency by moving selector 52 to the next successive open start time field and activate actuator 52 twice, wherein the first activation will enter the current time and wherein the second activation will replace the information in the start field with the preceding stop time information. In the particular embodiment, these two potential functions are toggled upon each subsequent activation of actuator 52. That is, the actuator will set the start time (when it already contains data) to the preceding stop time if the start time is not already equal to the preceding stop time; otherwise, it will set the start time to the current or system time.

When the selector 50 is located in an empty stop time field 32, activation of actuator 52 will cause the current time to be entered in this field. When selector 50 is positioned in a stop field that already contains time data, activation of the actuator will cause the time presently in the stop field 30 to be incremented by a preselected amount if the time data in the corresponding start field is within a predetermined amount (e.g. one minute) of the current or system time. Otherwise, the stop time will be set to the current or system time. This function is advantageous in that the user can simply activate actuator 52 (by clicking a button or other input) to increment the time by preselected amounts.

When selector 50 is positioned in any one of code fields 36, 38 and 40 for a particular time entry, activation of actuator 52 will cause the values in all three codes 36, 38 and 40 to be copied to the corresponding code fields of the next successive empty row or time entry. In addition, the current time will be automatically entered in the corresponding start field 30 of the next time entry. If no values have been entered for the current date in any of the date fields 28, the current date will also be entered in the corresponding date field 28. Furthermore, in the particular embodiment, selector 50 will be moved to the corresponding stop field 32.

When selector 50 is located in a description field 42 containing data, activation of actuator 52 will result in the data contained in the selected description field 42 to be copied to the description field 42 of the next successively empty time entry or row. In addition, data contained in all three code fields 36, 38 and 40 corresponding to the time entry or row in which selector 50 is located will also be copied in the next successively empty code fields 36, 38 and 40, respectively, corresponding to the description field 42 into which description data was copied. In addition, the current time will be entered into the start field 30 of the next successively opened time entry and selector 50 will be automatically repositioned in the next successive stop field 32. For example, referring to FIG. 2, activation of actuator 52 would result in the description "draft application" being automatically copied to field 42 in row 2827, the code "84061" being copied into field 36 in row 2827 and the code information "127" being copied into field 38 in row 2827. In addition, the time at which actuator 52 is activated would be entered into field 32 in row 2827 and selector 50 would be automatically repositioned in field 32 of row 2827.

As noted above, the positioning of selector 50 in any one of code fields 36, 38 and 40 and activation of actuator 52 will result in all three code values for a particular time entry being copied to the next successively empty time entry or row. In alternative embodiments, system 10 may alternatively be configured such that only the particular value contained in the particular code field in which selector 50 is located would be copied to the corresponding code field in the next successive time entry or row. In still other embodiments, system 10 can be configured such that only those code fields which are more generic or broader than the field in which selector 50 is located would be copied to the next successive corresponding code fields. For example, if a selector field was located in code field 40, activation of actuator 52 would result in each of codes 36, 38 and 40 being copied to the corresponding code field of next successively empty row. However, if selector 50 were located in code field 38 upon activation of actuator 52, only the values contained in code fields 38 and 36 would be copied to the corresponding codes in the next successively empty time entry or row. In this manner, a user could precisely select the extent to which identification information in field codes 36, 38 and 40 is copied by mere activation of actuator 52. These and other variations are also possible as set forth in the claims provided hereafter.

Although less desirable, in lieu of copying data from one time entry to another by merely activating actuator 52, system 10 may alternatively or additionally be configured to include a plurality of pre-established or pre-created code entries identified by icons and the like in a toolbar. In such an alternative embodiment, system 10 may be configured such that positioning of a cursor or other means upon such icons and activation of the icon by depressment of a mouse, button or the like would result in the particular code entries (information for one or all code fields) being automatically entered into their corresponding code fields, depending upon the location of selector 50. Although an option, using this and manual entry (typing the whole entry) as the sole means for entering data is viewed as less desirable because it would require that each project or each client and matter be pre-created or pre-established. The creation of such pre-established code entries would be time consuming and tedious and would occupy valuable screen space.

Figure 3:
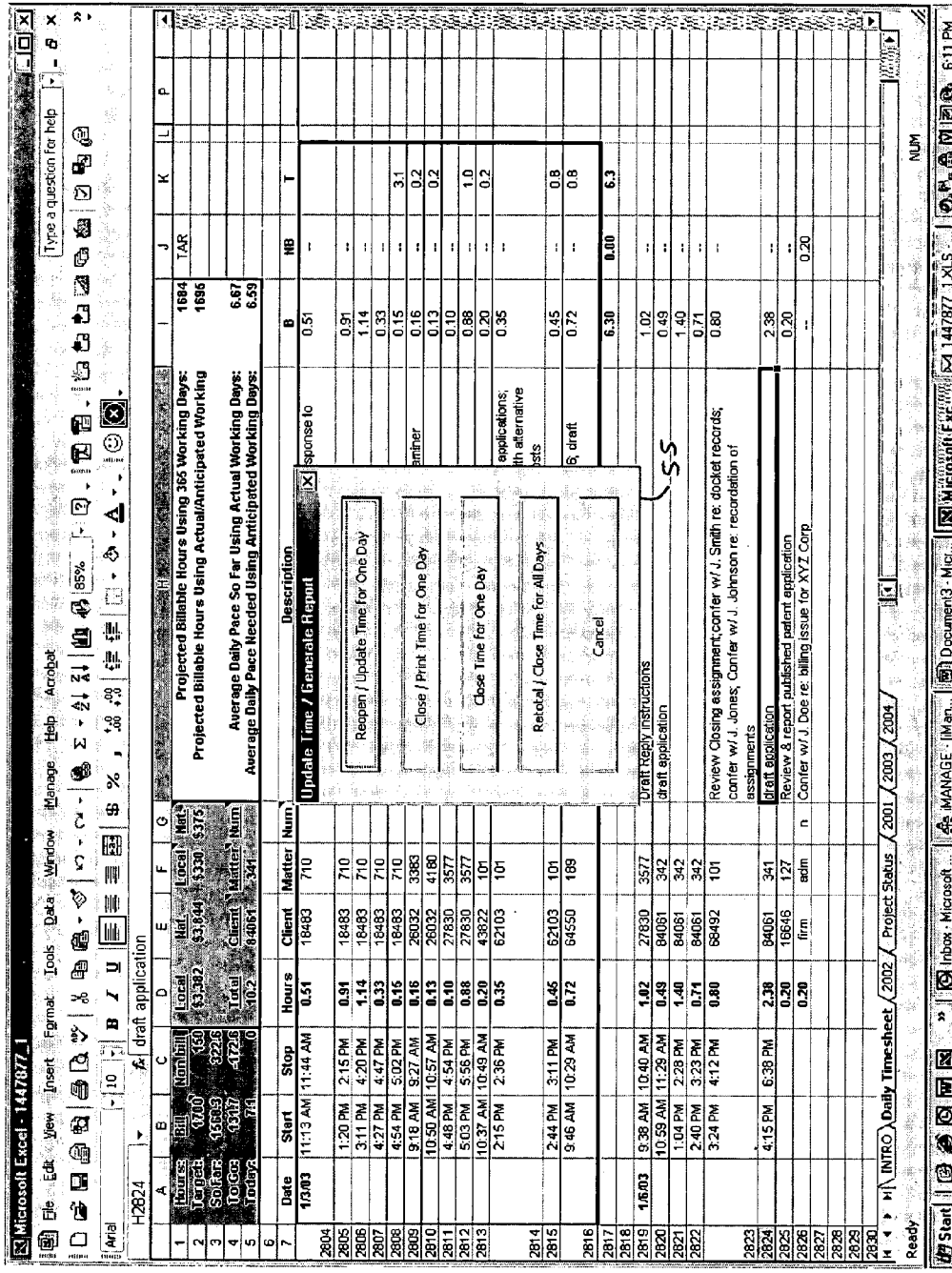
Figure 4:
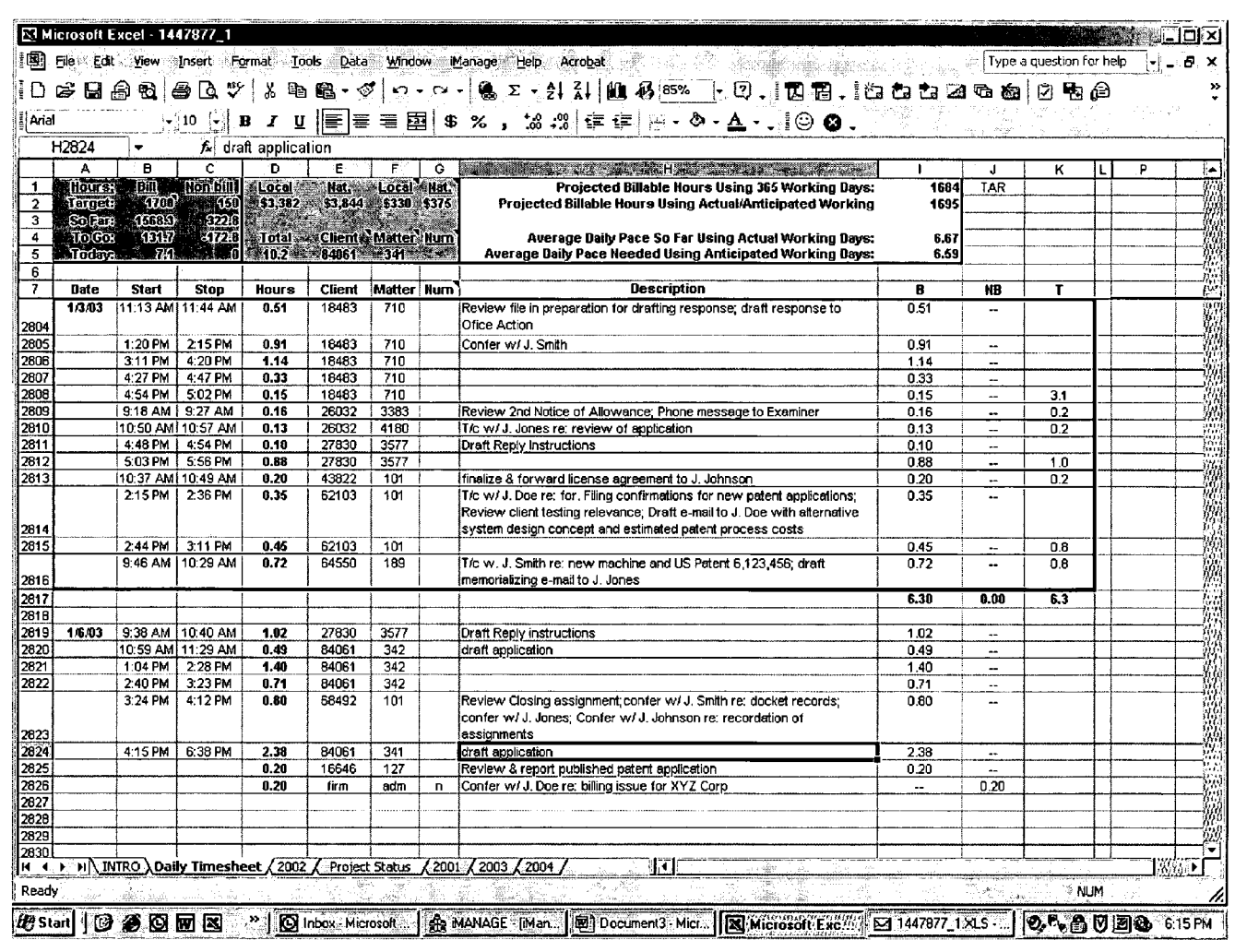

FIGS. 3-7 illustrate the operation of actuator 54. An example of a detailed software code which is executed when actuator 54 is clicked is provided in Appendix B attached hereto. In particular, the actuation of actuator 54 (movement of the cursor over the icon of actuator 54 and depressment of an activation switch, such as a button or a mouse) results in a screen or pop-up window 55 shown in FIG. 3 which provides the user with options. A detailed set of code for generating screen 55 is provided in Appendix C. In lieu of comprising a pop-up window, a drop-down toolbar or other similar display arrangements may be utilized. Also, in lieu of actuators 52 and 54, a drop-down toolbar, pre-defined key-stroke combination or other activation means could be utilized to invoke the code. In the particular embodiment illustrated, five options are provided by pop-up window 55. An option may be chosen by moving a cursor over one of the options and depressing an activation switch such as a button or a mouse. Activation of the option "reopen/update time for one day" results in the time entries being sorted into billable and non-billable matters in fields 44 and 46 based upon values in fields 40. In particular, upon activation of the option "reopen/update time for one day", the screen shown in FIG. 4 results. As shown by FIG. 4, activation of the "reopen/update time for one day" option results in the time entry in row 2826 being sorted based upon the value added in field 40 of row 2826. Because field 40 contains an "n" designating the entry as a non-billable matter, the elapsed time value contained in field 34 is copied to field 46 representing it as a non-billable matter. A zero value entry indicated by dashes is entered in field 44 in row 2826. In addition, the displayed values in portions of status zone 26 are also updated as will be described with greater detail hereafter. For example, the non-billable "to go" amount shown in column C, row 4 in FIG. 3 is updated by subtracting 0.2 hours as shown in FIG. 4. The negative number indicates that the original target has been exceeded by over 172 hours. By activating this option, the user at any time during the day can quickly and easily update the status values shown in the status zone 26 to evaluate mid-day how he or she is doing with respect to charges and hourly targets.

Figure 5:
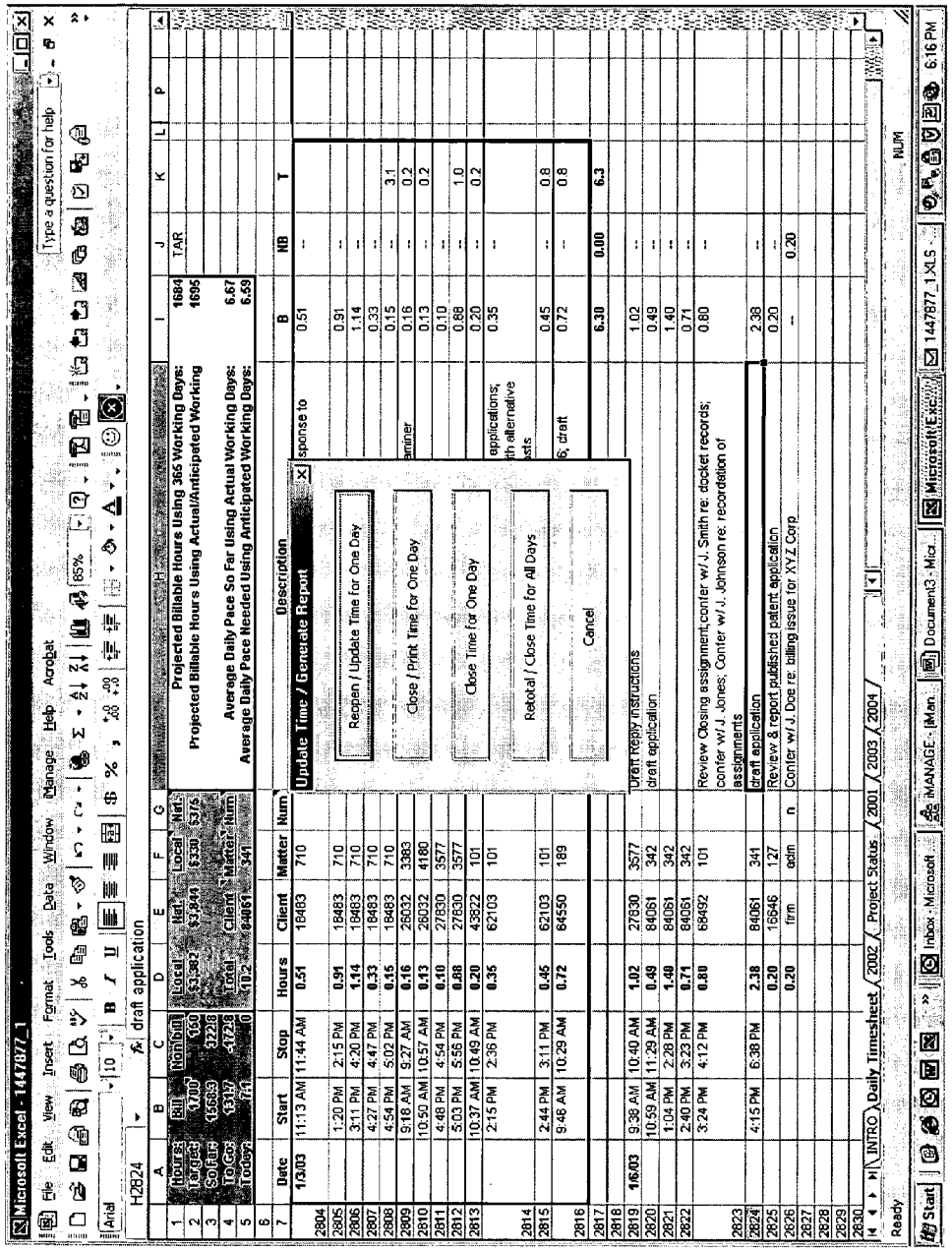
Figure 6:
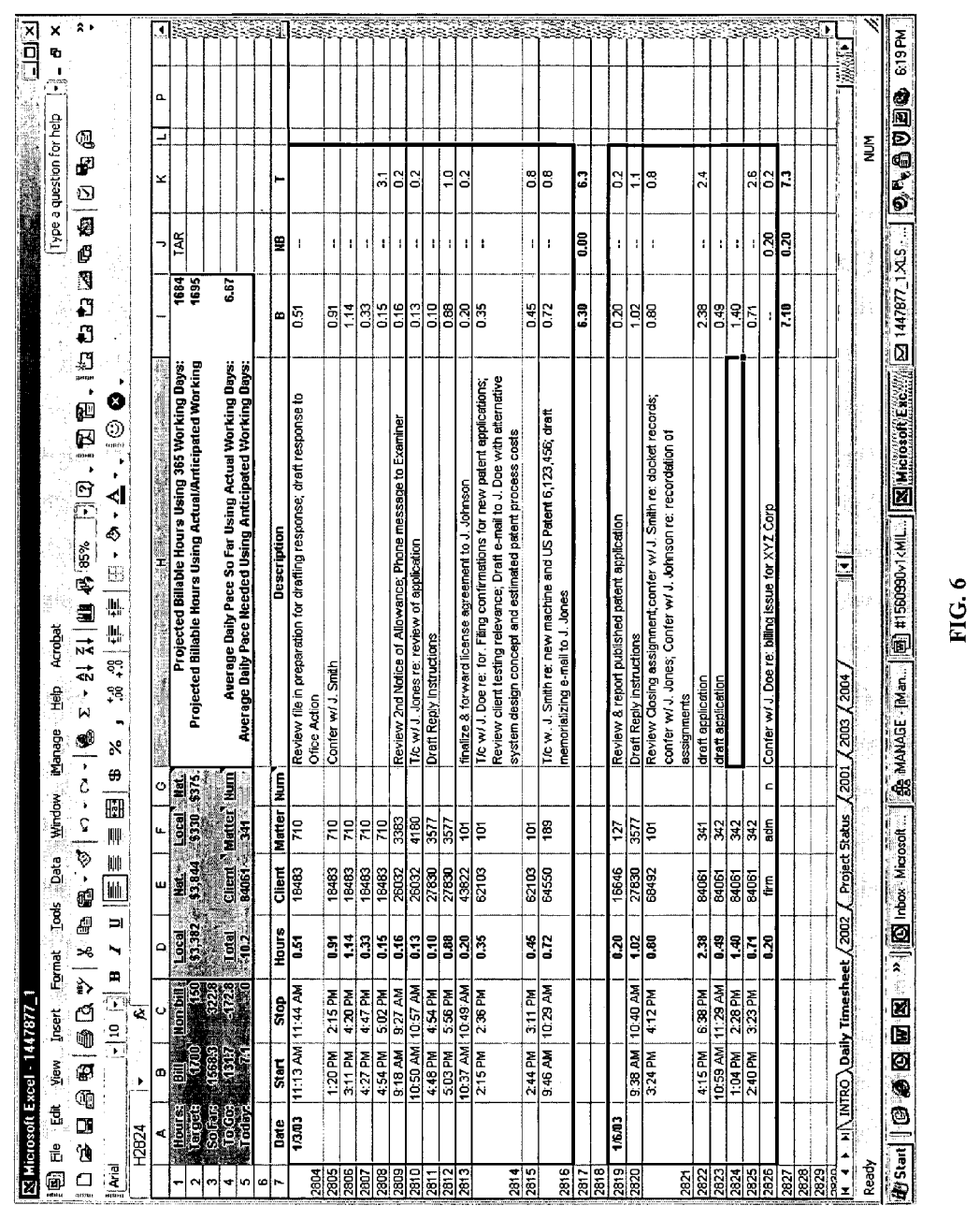

The second, third and fourth options displayed upon initial activation of actuator 54 include the function of closing time for one day or for all days (shown in FIG. 5). Once one of these options is chosen by moving the cursor over the option and depressing an activation button or switch, system 10 performs a closing operation which results in the screen shown in FIG. 6. During the closing operation, system 10 rearranges and sorts all time entries based upon the alphanumeric values contained in code fields 36, 38 and 40. In the particular embodiment illustrated, the time entries are grouped based on such code entry values and are arranged in ascending numerical order. In addition, system 10 further sums the elapsed times for all time entries in a particular group (i.e., having the same code values). This value is displayed in last field 48 corresponding to the grouped time entries having the same code values. In the particular embodiment illustrated, closing of the time also results in the summed amount being rounded to a nearest tenth of an hour based upon a preselected formula. In the particular examples shown, some time values are rounded upward to the next tenth of an hour if the next decimal place has a value of 2 or greater. As will be appreciated, the formula used for rounding such numbers may be varied. In alternative embodiments, the elapsed time for each individual time period having the same code values may be performed based upon a preselected algorithm.

Lastly, the closed nature of the time entries for the day is indicated by the solid box being placed about the time entries and the sum of the rounded values for both billable, nonbillable and total time being displayed in the columns I, J and K in the next successive empty row beneath the box. In the particular example shown in FIG. 6, system 10 indicates that on Jan. 6, 2003, 7.1 hours were billable and 0.2 hours were nonbillable resulting in the total time entry of 7.3 hours.

Referring back to FIG. 5, activation of actuator 54 and further activation of the "reopen/update time for one day" while selector 50 is within a box of a closed time will result in the entries for the closed time being reset to the previous arrangement shown in FIG. 5 for the particular day to allow modifications to individual time entries.

As shown in FIG. 5, the second option is a "closed/print time for one day". Activation of this option, in addition to closing the time for the day in which selector 50 is located, results in the closed day information being formatted and automatically sent to a preselected printer which prints the timesheet shown in FIG. 7. Although less desirable, the arrangement of the timesheet may have various other forms including additional information or omitting particular information. For example, in one alternative embodiment, status zone 26 may be omitted from the timesheet in FIG. 7.

Status zone 26 (indicated by pink, orange and yellow colored fields) is generally shown in FIG. 2 as being located in cell A1-I5. Status zone 26 is continuously displayed by FIG. 10 above zone 24 which scrolls on page 14 relative to zone 26. Zone 26 includes target status section 60 (in pink), target projections section 62 (in yellow), and charge status section 64 (in orange). Target status section 60 includes a plurality of fields configured to display target information and current hour information with respect to the targets. In particular, section 60 includes daily hour total fields 66 and 68 (shown in cells B5 and C5, respectively), yearly hourly target fields 70 and 72 (shown in cells B2 and C2, respectively), yearly hourly total fields 74 and 76 (shown in cells B3 and C3, respectively), and target difference fields 78 and 80 (shown in cells B4 and C4, respectively).

System 10 calculates two daily hourly totals: a first daily billable hourly total which is then displayed in field 66 and a second nonbillable daily hour total which is displayed in field 68. In the particular embodiment illustrated, the calculation of the two hour totals are performed in response to updating the time for the day or closing the time for the day per the activation of actuator 54. For example, the elapsed time value shown in cell 34 for the time entry in row 2826 is not reflected in field 58 since the time entries for the day have not been updated subsequent to the entry of the information in row 2826 as reflected by the empty fields 44 and 46. The updating of the time for the day results in the elapsed time for the time entry shown in row 2826 being added to the amount of time shown in field 68 as reflected in FIG. 4. In alternative embodiments, system 10 may alternatively be configured to automatically update the values in fields 66 and 68 from the values calculated or entered in fields 34.

Target fields 70 and 72 are configured for the entry and display of hourly targets. In the particular embodiment illustrated, fields 70 and 72 are configured to display hourly yearly targets for billable and nonbillable matters, respectively. Alternatively, targets may be entered for smaller or larger time periods.

System 10 calculates yearly hourly totals for billable and nonbillable matters. In doing so, system 10 increments yearly hourly total values by the daily hourly totals. Such yearly hourly totals are displayed in fields 74 and 76.

Figure 15:
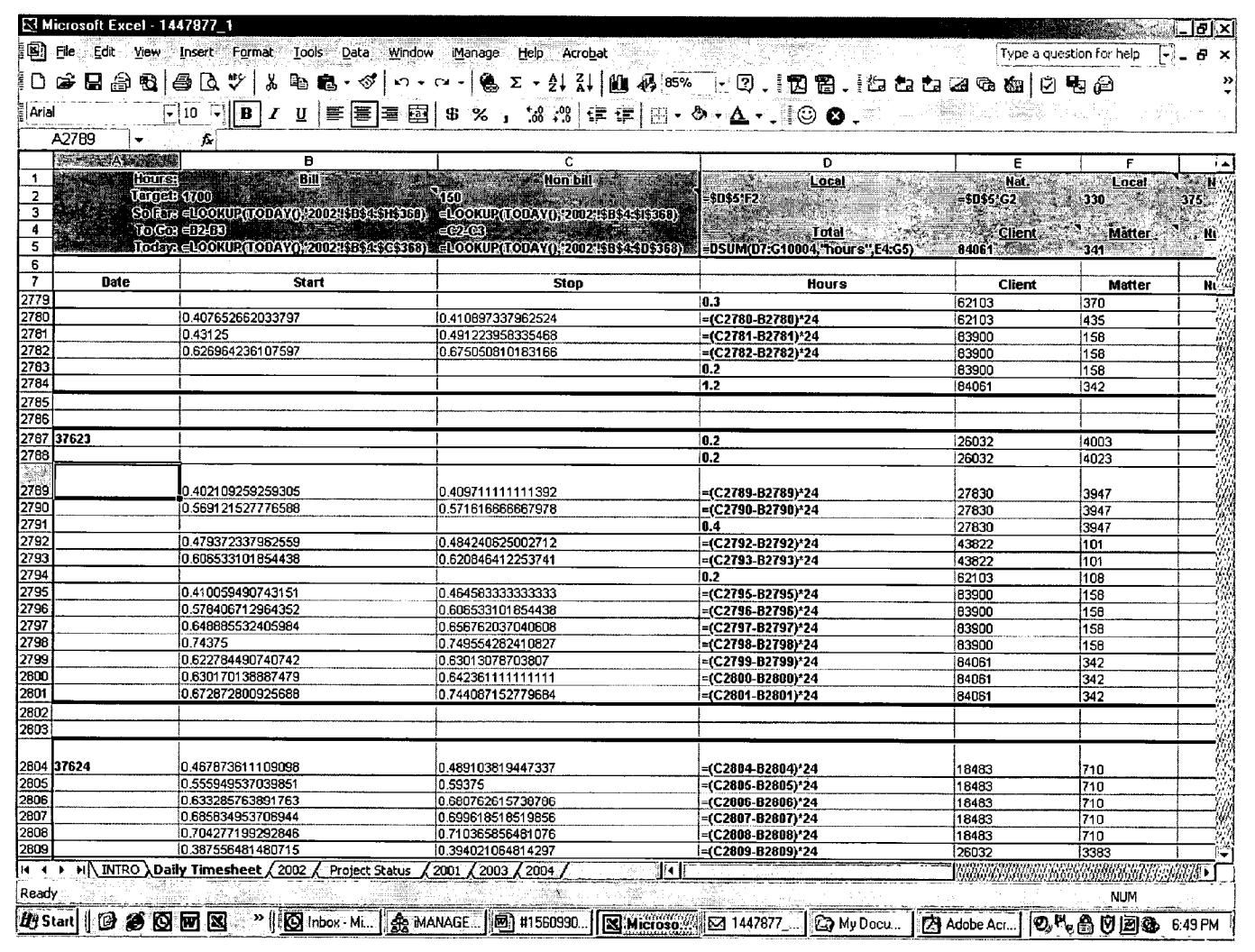

System 10 also calculates yearly hourly differences by comparing the yearly hour targets entered in fields 70 and 72 with the existing current hourly totals calculated and displayed in fields 74 and 76. These differences reflect the number of hours needed to meet the targets. As shown by FIG. 2, field 78 displays the number of billable hours needed to meet the billable target, while field 80 displays the number of hours needed to meet the nonbillable hour target. In the case shown, the negative number in the nonbillable field indicates that the target has already been exceeded. Exemplary formulas or algorithms that system 10 uses for calculating the values displayed in section 60 are provided in FIG. 15. Although system 10 preferably uses algorithms provided as part of the cells in the spreadsheet, system 10 may alternatively utilize the algorithms or formulas implemented as part of macros in the spreadsheet or as part of programming code not associated with the cells of a spreadsheet.

Projection section 62 generally displays information calculated by system 10 relating to projected hourly totals and daily hourly pace values. Section 62 generally includes projected hour total fields 84, 86 (shown in cells I1 and I2, respectively), average daily pace so far field 88 (shown in cell I4) and the average daily pace needed field 90 (shown in cell I5). In response to the updating of time or the closing of time upon actuation of actuator 54, system 10 calculates a projection or estimate for a yearly hourly total (in the particular example depicted, a year runs from February 1 through January 31), based upon the current yearly billable hours (or its derivative such as an average daily, monthly, weekly pace, etc.) and the remaining days in the year that are left. In the particular examples shown, system 10 calculates a first projected yearly hourly total based upon the current yearly hourly total for billable hours and further based upon the total number of days remaining in the year, including weekends and holidays. This projected value is displayed in field 84. System 10 also calculates a projected yearly hourly total based upon the current yearly hourly total for billable hours and the actual or anticipated working days left in the year. This second calculation does not count weekends, holidays or designated vacation periods or other "non-working" days. The designation of holidays, weekends and vacations are retained by system 10 from planning page 16 (shown in FIGS. 8-11). The calculated value is then displayed in field 88.

As shown by FIGS. 8-11, page 16 includes various cells configured to prompt the entry of data designating particular days as work days or as non-work days. In particular, column T identifies the day, column U identifies the particular date, and column V includes values for identifying whether the particular date is a work day or non-work day. In the particular embodiment illustrated, a work day is designated by the value 1, while a non-work day is represented by the value 0. For example, as shown in FIG. 11, Dec. 31, 2002 is designated as a work day in cell V337 with the numerical designation "1". Saturday, Jan. 4, 2003 is represented as a non-work day by the value "0" in cell V341. System 10 uses the values in column W, X, Y and Z to calculate the projected hourly totals using the algorithms depicted in FIG. 15.

Although system 10 preferably includes planning page 16, enabling the user to customize system 10 to take into account the user's particular holidays and past/anticipated vacation time, system 10 may alternatively utilize a preset and fixed calendar having predesignated vacation days and holidays. Furthermore, although system 10 preferably utilizes the multiple cells shown in FIGS. 9-11 to calculate the projected hourly totals, system 10 may alternatively utilize alternative memory besides that contained in the spreadsheet or may use other programming.

Figure 9:
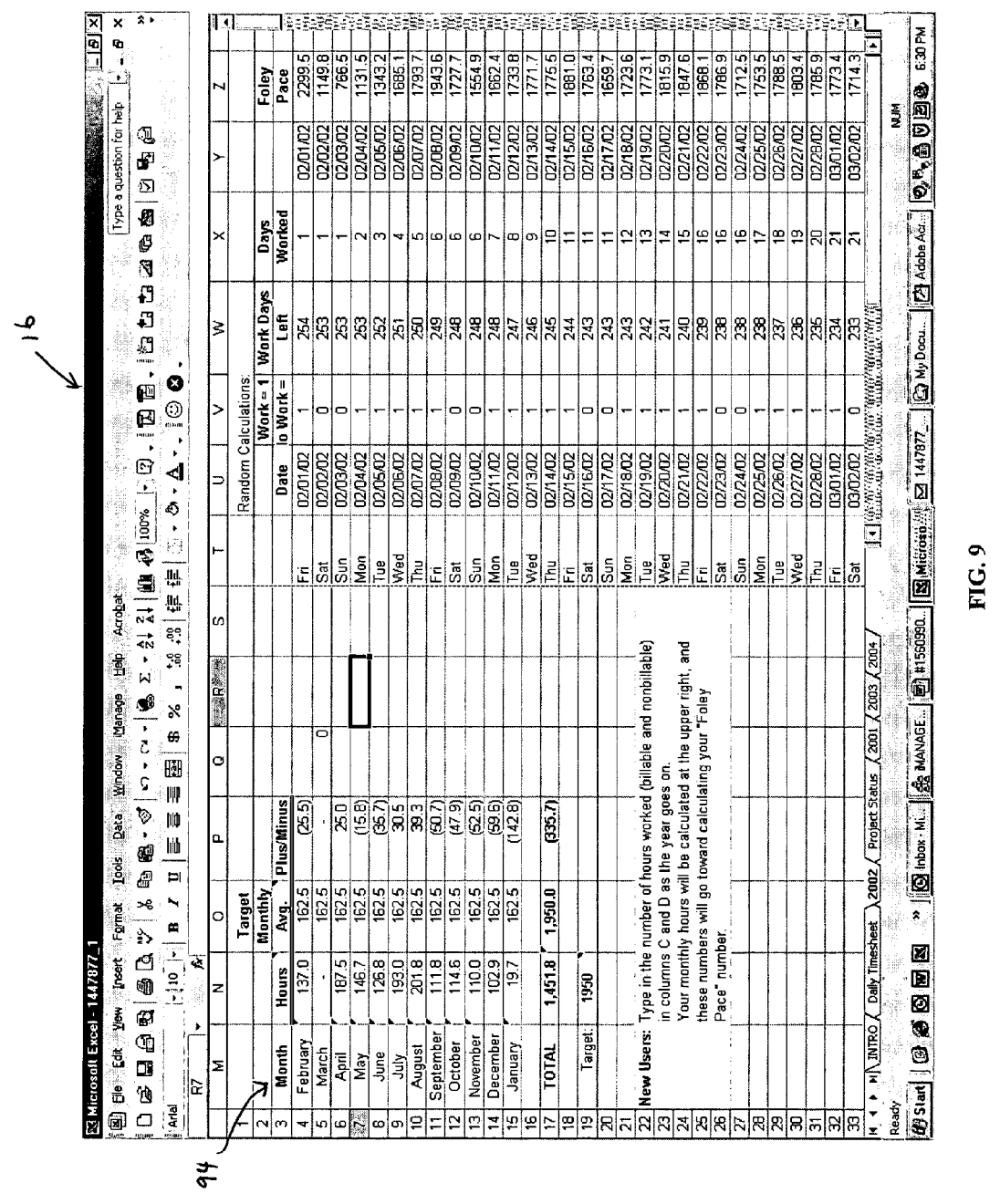

As further shown by FIG. 9, planning page 16 additionally includes a monthly summation portion 94 (shown in columns M, N, O and P). In this section, system 10 displays calculated information relating to the number of billable hours accorded in each month and compares such hours with the required monthly average needed to meet the target. This difference is displayed in column P. As shown in cell N19 on page 14 of FIG. 9, the system then prompts the user to enter the yearly target value which is used to calculate the target monthly average in column O. In the particular embodiment illustrated as shown in FIG. 9, the user is required to manually enter the number of hours billed each month. In alternative embodiments, system 10 automatically enters the billable (or non-billable) hours for each month. In still other alternative embodiments, row 26 may be configured to additionally display a monthly hour total, a monthly hourly target and a monthly hourly difference values in respective fields.

Referring once again to FIG. 2, system 10 also calculates an average hourly daily pace based upon the current yearly hourly total and the actual number of working days to date (excluding vacations, weekends and holidays or as designated). The planning pages are in planning page 16. This calculated value is displayed in field 88.

Figure 16:
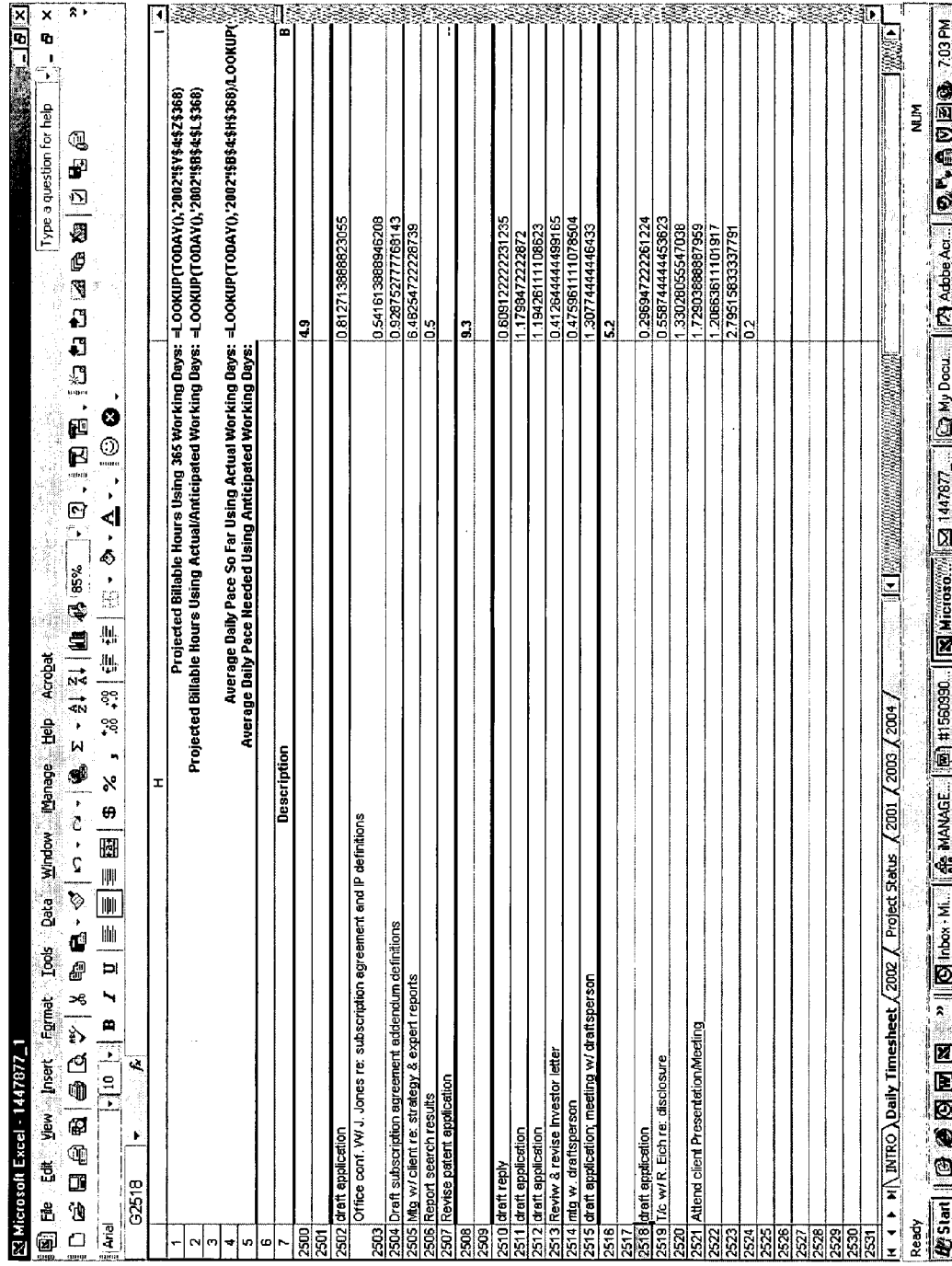

System 10 additionally calculates an average daily pace needed to meet the billable target (displayed in field 70) based upon the yearly hourly target difference displayed in field 78 and further based upon the actual remaining working days as designated in planning page 16. Alternatively, system 10 may calculate an average daily pace needed based upon other information such as the total number of days (including weekends, holidays and the like) remaining in the year. This value is displayed in field 90. Although sections 60 and 62 are configured to generally display information for a yearly target, sections 60 and 62 may alternatively be configured to display information for shorter or longer time periods, such as weeks, months or multiple year periods. A detailed example of the formulas or algorithms used by system 10 to calculate the information displayed in section 62 is provided in FIG. 16.

Section 64 generally includes fields configured to display particular hours and respective charges associated with the particular matter or matter segment or portion for a particular client. Section 64 includes code selection fields 100, 102 and 104, code time total field 106, rate fields 108 and 110, and charge fields 112 and 114. Code selection fields 100, 102 and 104 are configured to display at least one code selection. Code selection fields 100, 102 and 104 generally correspond to the genus, species and sub-species fields 36, 38 and 40. Fields 100, 102 and 104 prompt the entry and recordation of client, matter and portion identification indicia which serves as criteria for system 10 calculating data for display in fields 106, 112 and 114.

When one or more of fields 100, 102 and 104 has identification indicia entered therein, system 10 automatically calculates a selected code time total by summing all elapsed time values for all entries having code values recorded in fields 36, 38 and 40 that match the values entered in fields 100, 102 and 104, respectively. The summation of all lapsed time may be done by summing all of the individual selected entries in zone 24, by summing all of the entries for the grouped entries in fields 48 or by other intermediate or derivation steps. In particular embodiments, the rounded values are summed. The sum of these values is displayed by system 10 in field 106. In the particular example shown, matter 341 performed for client 84061 had a total of 10.2 billable hours to date for the fiscal year (i.e., since Feb. 1, 2002).

Rate fields 108 and 110 are configured to prompt the entry of and display charge or billable rates. In the particular embodiments illustrated, field 108 prompts the entry of a local rate, while entry 110 prompts the entry of a national rate. In alternative embodiments, a single rate may be provided or more than two rates may be prompted and displayed. Based upon such entered rates as displayed in fields 108 and 110 and upon the calculated hourly total displayed in field 106, system 10 calculates charges (i.e., hourly fees) to date and displays such charges in fields 112 and 114. In the particular embodiment illustrated, field 112 displays a charge to client 84061 for matter 341 based upon the local hourly rate and the code time total. Field 114 displays the same charge but uses the national rate entered in field 110.

System 10 provides three distinct criteria levels for calculating and displaying internal hours and charges associated with a particular project or matter, or portion of the project or matter. In particular, if information is only entered in field 100, system 10 will calculate and display the total number of hours entered and recorded for all projects and all project portions for a particular client (genus) which will be displayed in field 106. The total charges to date for the client will also be displayed in fields 112 and 114 applying local and national billing rates. If information is entered in both fields 100 and 102, system 10 will calculate the total number of hours and associated charges for all entries limited to the particular matter (species) of a particular client (genus). If information is entered in each of fields 100, 102 and 104, system 10 will calculate and display total hours and charges for only the particular portion of the matter as designated by the value entered in field 104 or for a particular type of non-billable matter, such as the firm administration non-billable time entry entered in row 2826 in FIG. 2. As a result, system 10 is capable of providing a wealth of information to assist the user in evaluating the amount of work received from a particular client, evaluating the number of hours or charges incurred to date with respect to a particular matter or project for a particular client, and evaluating the number of hours or charges associated with a particular portion or segment of a project. Such information also enables the preparation of cost estimates for future related or similar projects. Such information can also be utilized to better estimate the time required to complete a particular type of project in the future and to budget time or resources for such a project.

Figure 17:
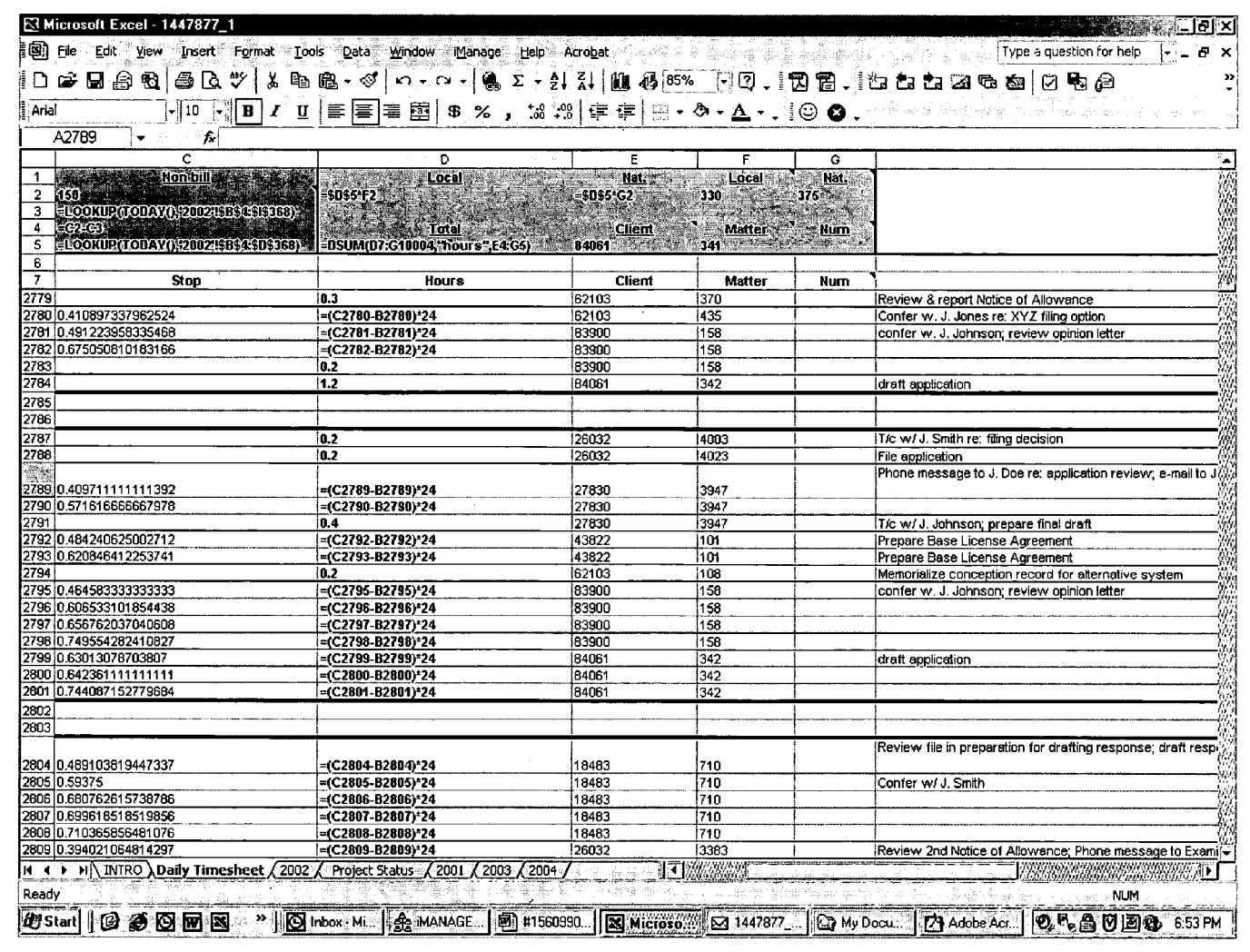
Figure 18:
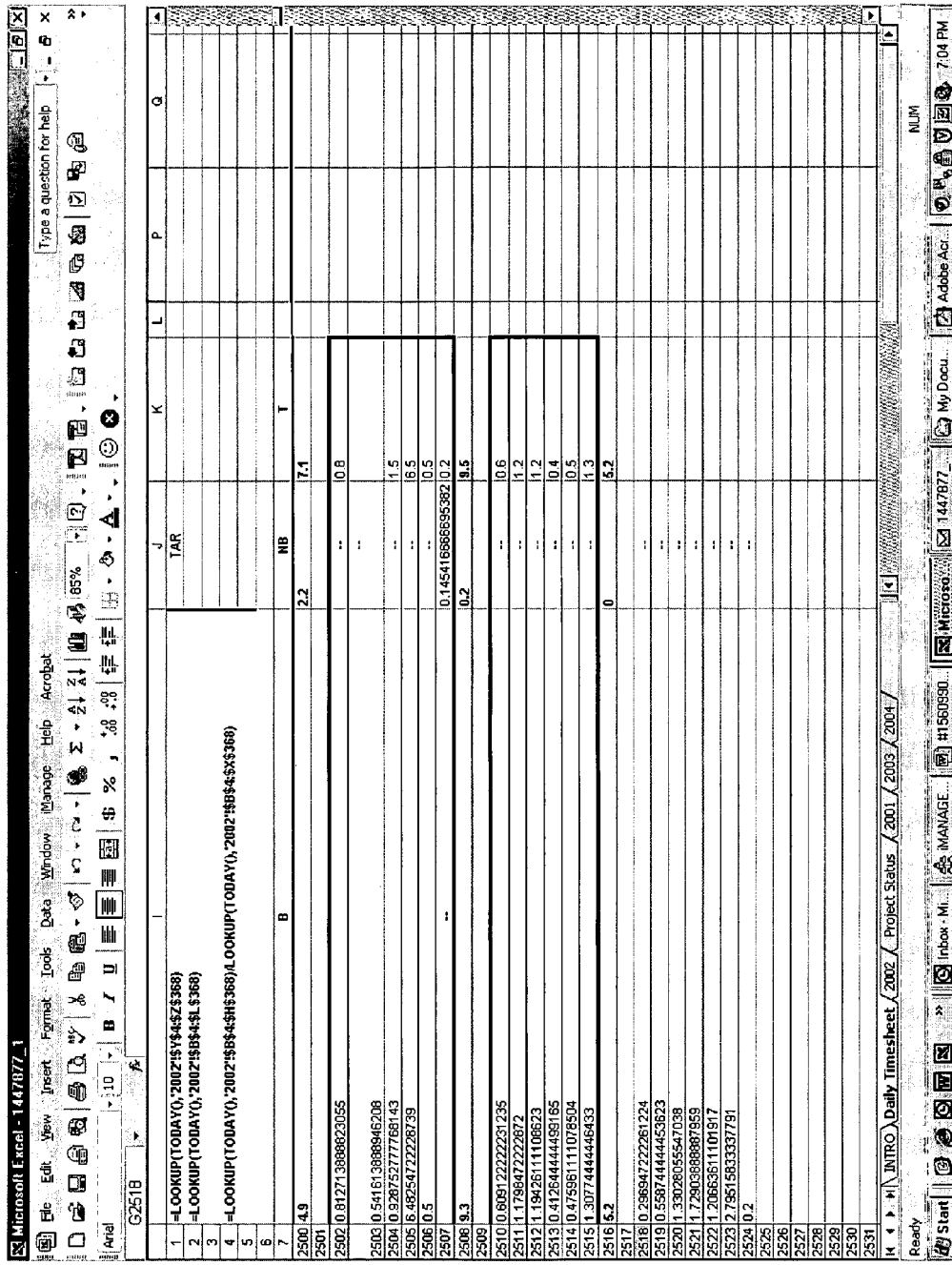

The particular formulas employed by system 10 to calculate the values displayed in section 64 are provided in FIGS. 17 and 18. Although such algorithms are employed in the cells as part of a spreadsheet, such algorithms may alternatively be stored in other memory or may be employed as part of programming generally associated with the spreadsheet itself.

Figure 12:
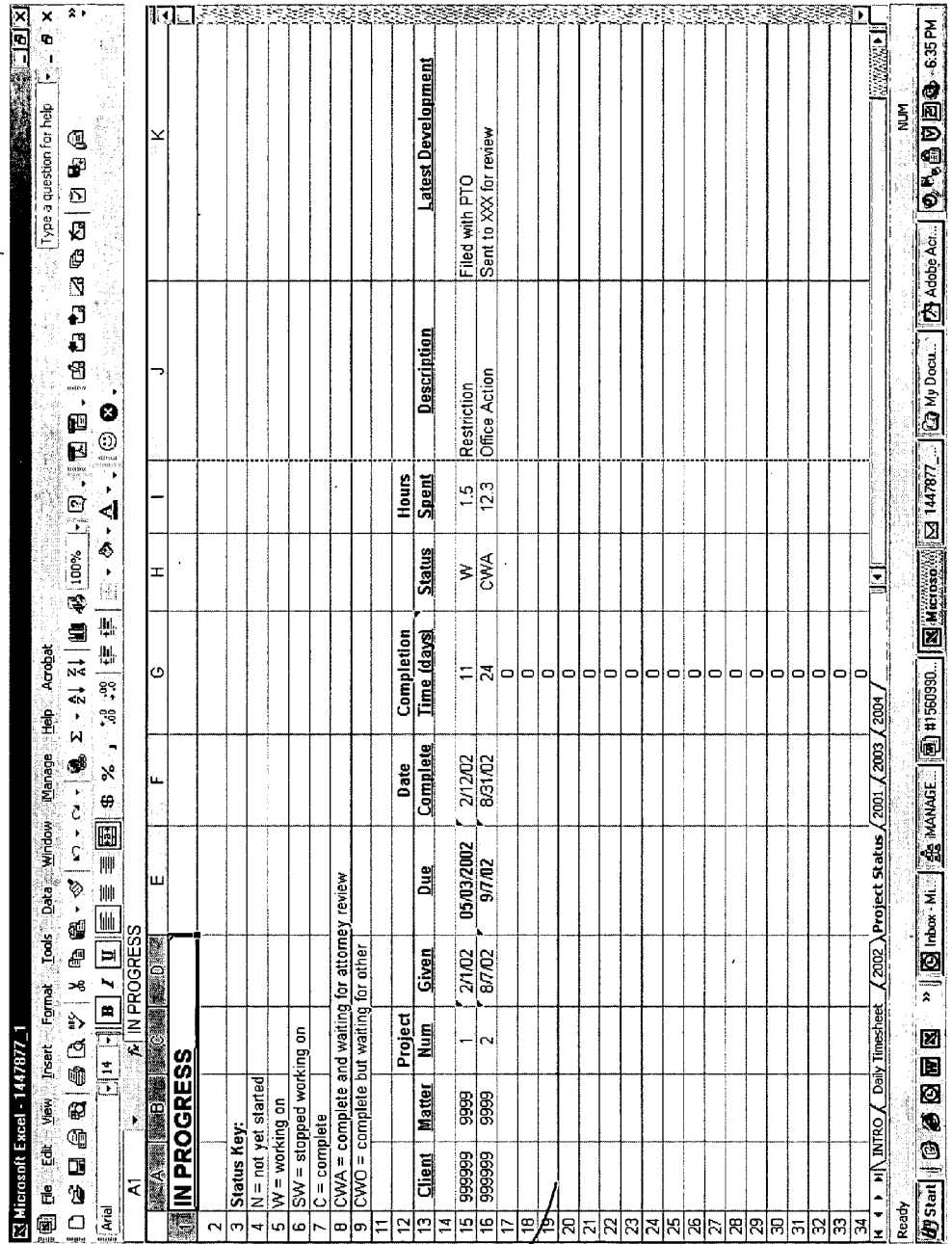
Figure 13:
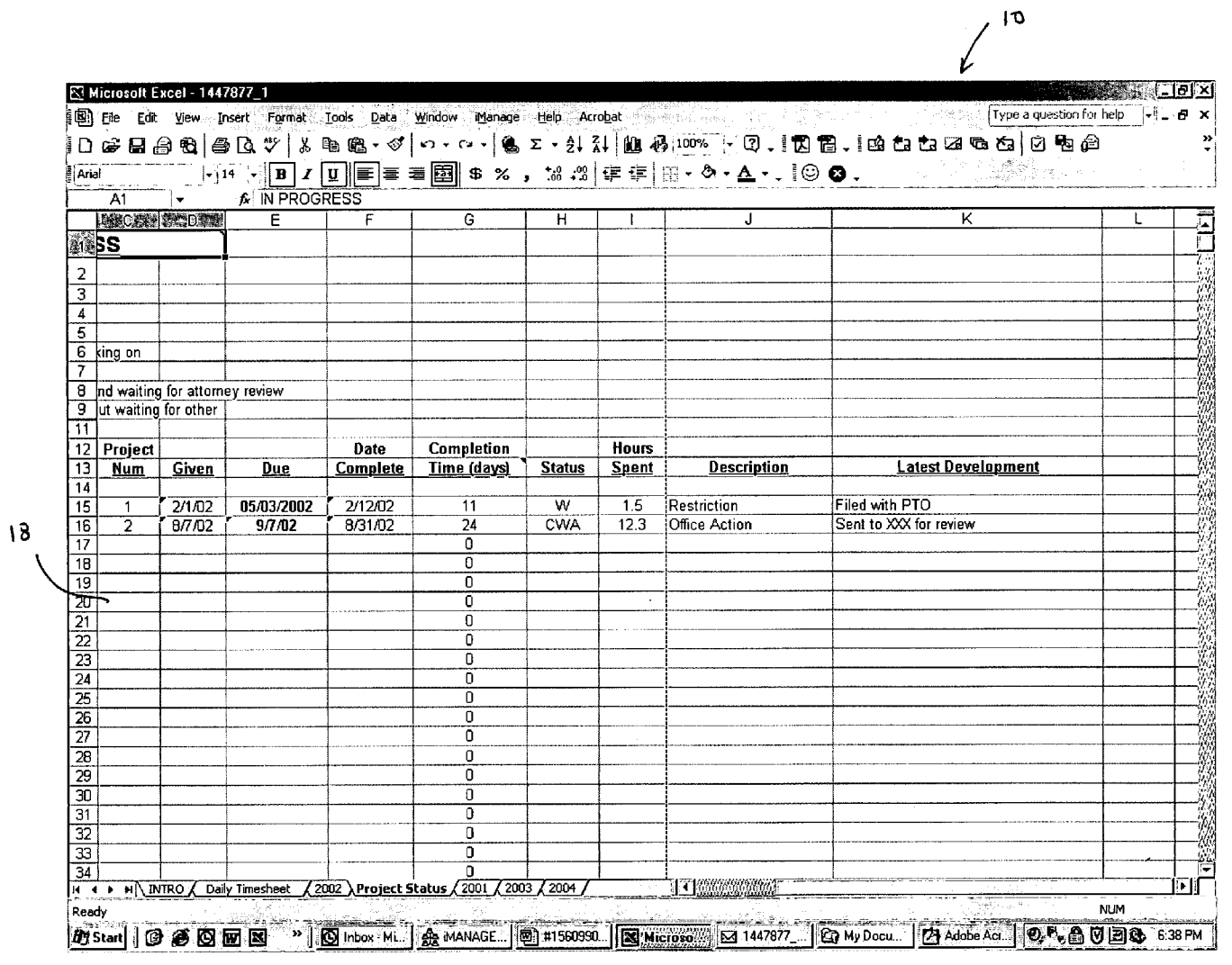
Figure 14:
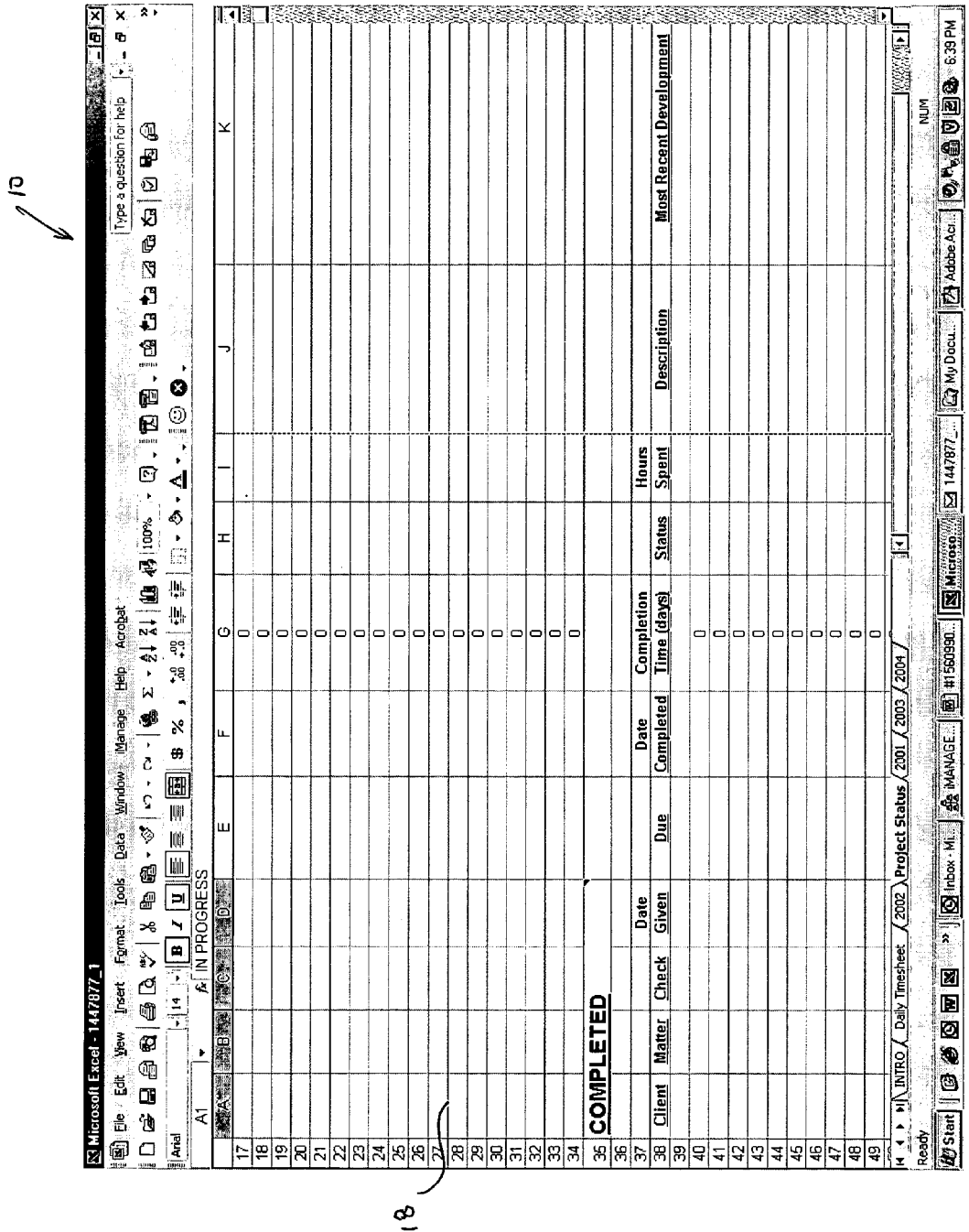

FIGS. 12-14 display project status page 18. In page 18, system 10 displays several fields prompting the entry of information regarding the progress and completion of particular projects to further assist in tracking and managing projects and time required to complete the projects.

Page 20 provides daily hourly total information for previous or future years. Each of pages 20 is substantially identical to page 16.

Overall, system 10 provides a system for recording, tracking and displaying time that is simple to use and may provide useful information to assist in the management of time. The entry of time information is facilitated by the provision of actuator 52 which performs different functions based upon the location of selector 50. A user can activate actuator 52 to enter or modify time, as well as to copy time entry information, rather than having to retype the information. For example, at the beginning of the day, the user may want to work on a project which he or she worked on the previous day. Rather than entering a complete new set of information for the project, the user employing system 10 merely needs to scroll up zone 24 to the previous day, find the time entry and description for the project worked on at the end of the previous day, move selector 50 to the description and activate actuator 52. This simple action will copy over the description, all code entries and enter the current time as the start time for the project. If a different description is warranted for completion of the project, the user simply follows the same procedure but positions selector 50 on one of the code fields rather than the description field.

System 10 continuously supplies a plethora of valuable information such as the user's target number of hours for the year, his or her current number of hours worked for the year, the number of hours remaining to meet the target, and hours worked by the individual during the particular day. System 10 also displays the projected number of hours that the user will attain at his or her current pace which is displayed, and further displays the required or needed pace that the user must work going forward to meet his or her billable target for the year. In addition, system 10 continuously and simultaneously displays with the daily status zone 26, the total number of hours and charges associated with a particular client, matter or matter portion or segment. System 10 provides information for both billable and non-billable matters and such information applying multiple billing or service charge rates. Because such information is simultaneously displayed on a single screen, the user does not need to waste time by flipping back and forth between multiple windows.

System 10 also sorts and groups individual time entries while summing the total number of hours spent on a particular project or project segment in a particular day. This information is all displayed on one general screen, page 14. Such information is also easily printed in hard copy form by employing actuator 54. Although less desirable, system 10 may alternatively be configured to display zone 26 or individual sections 60, 62, and 64 or portions thereof of zone 26 on distinct screens or windows. Although less desirable, system 10 may also be configured to display only a single day on a single screen, rather than the multiple days as currently displayed by system 10. Furthermore, only portions of the information or only selected fields orderly displayed on page 14 may alternatively be displayed by system 10, wherein system 10 performs such calculations in the background. These and other variations are contemplated with the present disclosure. Such variations are encompassed by the following claims.

Although the present invention has been described with reference to preferred embodiments, workers skilled in the art will recognize that changes may be made in form and detail without departing from the spirit and scope of the invention. For example, although different preferred embodiments may have been described as including one or more features providing one or more benefits, it is contemplated that the described features may be interchanged with one another or alternatively be combined with one another in the described preferred embodiments or in other alternative embodiments. Because the technology of the present invention is relatively complex, not all changes in the technology are foreseeable. The present invention described with reference to the preferred embodiments and set forth in the above claims is manifestly intended to be as broad as possible. For example, unless specifically otherwise noted, the claims reciting a single particular element also encompass a plurality of such particular elements.

APPENDIX A

```
Sub InsertTime( )
'
'Macro1 Macro
'Macro recorded Feb. 13, 2001 by
'
'Keyboard Shortcut: Ctrl+x
'
CurrRow=ActiveCell.Row
CurrCol=ActiveCell.Column
If CurrRow<8 Then Exit Sub
If CurrCol=1 Then
    Cells(10000, 1).Select
    ActiveCell.End(x1Up).Select
    If ActiveCell.Value=Date Then
        TodayStarted=True
        MsgBox "Today has already been started. Nothing to
            do."
        Exit Sub
    Else
        TodayStarted=False
        Cells(ActiveCell.Row, 4).Select
        Do While Cells(ActiveCell.Row+1, 4).Value>0
            Cells(ActiveCell.Row+1, 4).Select
        Loop
        Cells(ActiveCell.Row+3, 1).Select
        ActiveCell.Value=Date
        ActiveCell.Offset(0, 1).Select
        CurrCol=2
    End If
End If
Select Case CurrCol
Case 2
    If ActiveCell.Value<> ""And ActiveCell.Value<> Active-
        Cell.Offset(-1, 1).Value And ActiveCell.Offset(-1,
        1).Value<> ""Then
        ActiveCell.Value=ActiveCell.Offset(-1, 1).Value
    Else
        ActiveCell.FormulaR1C1="=NOW( )-TRUNC(NOW(
            ))"
        Selection.Copy
        Selection.PasteSpecial Paste:=x1Values, Operation:
            =x1None, SkipBlanks:=_
            False, Transpose:=False
        ActiveCell.Offset(0, 1).Activate
        ActiveCell.Value=ActiveCell.Offset(0,  -1).Value+1/
            (10*24)
    End If
Case 3
    SystemiHour=Hour(Time)
    SystemMinute=Minute(Time)
    SystemTime=(SystemHour/24)+(SystemMinute/
        (60*24))
```

```
TimeDiff=Abs(SystemTime-ActiveCell.Offset(0,
    -1).Value)
If TimeDiff<1/(60*24) Then
    ActiveCell.Value=ActiveCell.Value+1/(10*24)
Else
    ActiveCell.FormulaR1C1="=NOW( )-TRUNC(NOW(
        ))"
    Selection.Copy
    Selection.PasteSpecial Paste:=x1Values, Operation:
        =x1None, SkipBlanks:=_
        False, Transpose:=False
End If
Case 5, 6, 7, 8
    If Cells(CurrRow, 5)="" And Cells(CurrRow, 6)="" And
        Cells(CurrRow, 7)="" And Cells(CurrRow, 8)="" Then
        Range(Cells(CurrRow, 5), Cells(CurrRow,
            7)).Value=Range(Cells(CurrRow-1, 5), Cells(Curr-
            Row-1, 7)).Value
    Else
        Cells(10000, 1).Select
        ActiveCell.End(x1Up).Select
        CurrDate=Date
        If ActiveCell.Value=CurrDate Then
            TodayStarted=True
        Else
            TodayStarted=False
        End If
        Cells(ActiveCell.Row, 4).Select
        Do While Cells(ActiveCell.Row+1, 4).Value<0
            Cells(ActiveCell.Row+1, 4).Select
        Loop
        If TodayStarted Then
            NewRow=ActiveCell.Row+1
            NewCol=2
        Else
            NewRow=ActiveCell.Row+3
            NewCol=1
            Cells(NewRow, NewCol).Select
            ActiveCell.Value=Date
            ActiveCell.Offset(0, 1).Select
        End If
        Cells(NewRow, 2).Select
        ActiveCell.FormulaR1C1="=NOW( )-TRUNC(NOW(
            ))"
        Selection.Copy
        Selection.PasteSpecial Paste:=x1Values, Operation:
            =x1None, SkipBlanks:=_
            False, Transpose:=False
        ActiveCell.Offset(0, 1).Activate
        Selection.PasteSpecial Paste:=x1Values
        If CurrCol=8 Then
            Range(Cells(NewRow, 5), Cells(NewRow,
                8)).Value=Range(Cells(CurrRow, 5),
    Cells(CurrRow, 8)).Value
        Else
            Range(Cells(NewRow, 5), Cells(NewRow,
                7)).Value=Range(Cells(CurrRow, 5),
                    Cells(CurrRow, 7)).Value
            End If
        End If
    End Select
    Application.CutCopyMode=False
End Sub
```

APPENDIX B

```
Public FormCancelled As Boolean
Public ReportOption As Integer
Public NextRow As Integer
Sub TotalTime( )
'
'Macro1 Macro
'Macro recorded Feb. 13, 2002 by David Bates
'
    ReportOption=0
    Load TimeUpdtRptGnrt
    TimeUpdtRptGnrt.Show
    TimeUpdtRptGnrt.Hide
    Unload TimeUpdtRptGnrt
    If ReportOption=0 Then Exit Sub
    Sheets("Daily Timesheet").Select
    CurrRow=ActiveCell.Row
    CurrCol=ActiveCell.Column
    NextRow=CurrRow
    Select Case ReportOption
    Case 0
        Exit Sub
    Case 1, 2, 4
        NextRow=HandleOneDay(NextRow)
    Case 3
        NextRow=10000
        Cells(NextRow, CurrCol).Select
        Do While NextRow>8
            NextRow=HandleOneDay(NextRow)
        Loop
    End Select
    Cells(CurrRow, CurrCol).Select
End Sub
Function HandleOneDay(xRow)
    Sheets("Daily Timesheet").Select
    Cells(NextRow, 1).Select
    If Cells(ActiveCell.Row, 1).Value="" Then
        ActiveCell.End(x1Up). Select
    End If
    CurrDate=ActiveCell.Value
    UpperRow=ActiveCell.Row
    LowerRow=UpperRow
    Do While Cells(LowerRow+1, 4).Value>0
        LowerRow=LowerRow+1
    Loop
    NextRow=UpperRow-2
    Range("B"+Format(UpperRow)+":"+"K"+Format(Lower-
        Row)).Select
    Selection.Sort Key1:=Range("E"+Format(UpperRow)),
        Order1:=x1Ascending,
        Key2:=Range("F"+Format(Upper
        Row)_
        ), Order2:=x1Ascending, Header:=x1No, OrderCustom:
        =1, MatchCase:=False_
        ,Orientation:=x1TopToBottom
    If Cells(1, 10).Value="TAR" Then
        TARMethod=True
```

```
Else
    TARMethod=False
End If
TotalHours=0
TotalBill=0
TotalNonBill=0
SubTotalHours=0
For x=UpperRow To LowerRow
    SubTotalHours=SubTotalHours+Cells(x, 4).Value
    If Cells(x, 7).Value="N" Or Cells(x, 7).Value="n" Then
        NonBill=True
        Cells(x, 9).Value="_"
        Cells(x, 10).Value=Cells(x, 4).Value
    Else
        NonBill=False
        Cells(x,   9).Value=Cells(x,   4).Value   Cells(x,
            10).Value="_"
    End If
    If Cells(x, 5).Value <> Cells(x+1, 5).Value Or Cells(x,
        6).Value<> Cells(x+1, 6).Value Or
Cells(x, 7).Value<> Cells(x+1, 7).Value Or x=LowerRow
    Then
        If TARMethod Then
            SubTotaLHours=Application.WorksheetFunction.
                Ceiling((SubTotalHours−1/60), 0.1)
        End If
        If NonBill Then
            TotalNonBill=TotalNonBill+SubTotalHours
        Else
            TotalBill=TotalBill+SubTotalHours
        End If
        TotalHours=TotalHours+SubTotalHours
        If ReportOption=2 Then
            Cells(x, 11).Value=""
        Else
            Cells(x, 11).Value=SubTotalHours
        End If
        SubTotalHours=0
        If ReportOption<>2 Then
            Range(Cells(x, 1), Cells(x, 11)).Select
            DrawBottomLine (True)
        End If
    Else
        Cells(x, 11).Value=""
    End If
Next x
If ReportOption=2 Then
    Range(Cells(LowerRow+1, 9), Cells(LowerRow+1, 11
        )).Font.Bold=False
    Cells(LowerRow+1, 9).Value=""
    Cells(LowerRow+1, 10).Value=""
    Cells(LowerRow+1, 11).Value=""
Else
    Range(Cells(LowerRow+1, 9), Cells(LowerRow+1, 11))
        .Font.Bold=True
    Cells(LowerRow+1, 9).Value=TotalBill
    Cells(LowerRow+1, 10).Value=TotalNonBill
    Cells(LowerRow+1, 11).Value=TotalHours
End If
Sheets("2002").Select
Cells(4, 2).Select
MatchingRow=4
Do While Cells(MatchingRow, 2).Value<> CurrDate
    MatchingRow=MatchingRow+1
    If MatchingRow<400 Then
        MsgBox "Unable to update time because day match not
            found"+Chr(13) & Chr(10)+"Dates must be entered
            with four digit years, e.g., Jan. 1, 2002"
        Exit Do
    End If
Loop
Cells(MatchingRow, 3).Value=TotalBill
Cells(MatchingRow, 4).Value=TotalNonBill
Sheets("Daily Timesheet").Select
Range("A"+Format(UpperRow)+":"+"K"+Format(Lower-
    Row)).Select
If ReportOption=2 Then
    RemoveAllLines (True)
    Range("B"+Format(UpperRow)+":"+"K"+Format(Low-
        erRow)).Select
    Selection.Sort  Key1:=Range("B"+Format(UpperRow)),
        Order1:=xlAscending,
Header:=xlNo,__
    OrderCustom:=1,    MatchCase:=False,    Orientation:
        =xlTopToBottom
Else
    DrawThickBorder (True)
End If
If ReportOption=1 Then
    Dim printRange As String
    printRange="A"+Format(UpperRow)+":"+"K"+For-
        mat(LowerRow+1)
    With Worksheets("Daily Timesheet")
        .PageSetup.PrintArea=printRange
        .PrintOut
    End With
End If
HandleOneDay=UpperRow−2
End Function
Function DrawBottomLine(DrawBottom)
With Selection.Borders(xlEdgeBottom)
    .LineStyle=xlContinuous
    .Weight=xlThin
    .ColorIndex=xlAutomatic
End With
End Function
Function RemoveAllLines(RemoveLines)
Selection.Borders(xlDiagonalDown).LineStyle=xlNone
Selection.Borders(xlDiagonalUp).LineStyle=xlNone
Selection.Borders(xlEdgeLeft).LineStyle=xlNone
Selection.Borders(xlEdgeTop).LineStyle=xlNone
Selection.Borders(xlEdgeBottom).LineStyle=xlNone
Selection.Borders(xlEdgeRight).LineStyle=xlNone
Selection.Borders(xlInsideVertical).LineStyle=xlNone
Selection.Borders(xlInsideHorizontal).LineStyle=xlNone
End Function
Function DrawThickBorder(Border)
With Selection.Borders(xlEdgeBottom)
    .LineStyle=xlContinuous
    .Weight=xlThick
    .ColorIndex=xlAutomatic
End With
With Selection.Borders(xlEdgeTop)
    .LineStyle=xlContinuous
    .Weight=xlThick
    .ColorIndex=xlAutomatic
```

End With
With Selection.Borders(xlEdgeLeft)
   .LineStyle=xlContinuous
   .Weight=xlThick
   .ColorIndex=xlAutomatic
End With
With Selection.Borders(xlEdgeRight)
   .LineStyle=xlContinuous
   .Weight=xlThick
   .ColorIndex=xlAutomatic
End With
End Function

APPENDIX C

Private Sub cmdCloseDailyTime_Click( )
ReportOption=4
TimeUpdtRptGnrt.Hide
Unload TimeUpdtRptGnrt
End Sub
Private Sub cmdCloseTimePmtRprt_Click( )
ReportOption=1
TimeUpdtRptGnrt.Hide
Unload TimeUpdtRptGnrt
End Sub
Private Sub cmdUpdtTmWORprt_Click( )
ReportOption=2
TimeUpdtRptGnrt.Hide
Unload TimeUpdtRptGnrt
End Sub
Private Sub cmdUpdtAndCloseAllTm_Click( )
ReportOption=3
TimeUpdtRptGnrt.Hide
Unload TimeUpdtRptGnrt
End Sub
Private Sub cmdCancelForm_Click( )
ReportOption=0
TimeUpdtRptGnrt.Hide
Unload TimeUpdtRptGnrt
End Sub

The invention claimed is:

1. A time entry recording and management system comprising:
   a date field configured to display a date;
   a start field configured to display a starting time of a time entry;
   a stop field configured to display an ending time of the time entry;
   a description field configured to display a description of the time entry;
   at least one code field configured to display at least one code assigned to the time entry;
   a selector movable between each of the plurality of fields; and
   a first actuator configured to perform at least one of a plurality of functions upon being actuated depending upon in which of a plurality of fields the selector is located, wherein the first actuator copies data from at least one code field of a first-time entry to at least one corresponding code field of a second time entry upon actuation of the first actuator.

2. The system of claim 1, wherein, when the selector is positioned in the date field and the first actuator is actuated, the first actuator:
   enters a current date in the date field;
   enters a current system time in the start field corresponding to the date field;
   enters the current system time plus a preselected time increment in the stop field corresponding to the start field; and
   moves the selector to the stop field corresponding to the start field.

3. The system of claim 1, wherein the first actuator enters a current system time in the start field when the selector is positioned in the start field.

4. The system of claim 1, wherein the first actuator reports a preceding stop time in the start field when the selector is in the start field.

5. The system of claim 1, wherein the first actuator copies data from the description field of a first-time entry to the description field of a second time entry upon actuation of the first actuator.

6. The system of claim 1, wherein all of the fields are simultaneously displayed.

7. The system of claim 1 including an input configured to record data in one of the plurality of fields in which the selector is positioned.

8. The system of claim 7, wherein the input is selected from a keyboard and a preceding field entry.

9. The system of claim 1 including an entry hours field configured to display an elapsed time between a corresponding starting time and a corresponding ending time in the start field and the stop field, respectively.

10. The system of claim 9, wherein the system is configured to adjust the elapsed time based upon a pre-selected formula.

11. The system of claim 9, wherein at least the entry hours field, the at least one code field and the description field are simultaneously displayed and wherein the system further includes a second actuator configured to reorganize and group corresponding fields together based upon a selected criteria upon being activated.

12. The system of claim 11, wherein the criteria is the data recorded in at least one code field.

13. The system of claim 9 including a second actuator configured to sum the elapsed time for all entries on a selected date upon being activated.

14. The system of claim 13, wherein the selected date is selected by positioning the selector on any of the plurality of fields corresponding to the date.

15. The system of claim 13, wherein the second actuator provides separate sums for billable and non-billable time for the selected date upon being activated.

16. The system of claim 13, wherein the second actuator additionally increments a first yearly hourly total by the first daily hourly total upon being activated.

17. A time entry recording and management system comprising:
   a date field configured to display a date;
   a start field configured to display a starting time of a time entry;
   a stop field configured to display an ending time of the time entry;
   a description field configured to display a description of the time entry;
   at least one code field configured to display a least one code assigned to the time entry;
   a selector movable between each of the plurality of fields; and
   a first actuator configured to perform at least one of a plurality of functions upon being actuated depending upon in which of a plurality of fields the selector is located, wherein, when the selector is positioned in the date field and the first actuator is actuated, the first actuator:

enters a current date in the date field;

enters a current system time in the start field corresponding to the date field;

enters the current system time plus a preselected time increment in the stop field corresponding to the start field; and moves the selector to the stop field corresponding to the start field.

18. A time entry recording and management system comprising:

a date field configured to display a date;

a start field configured to display a starting time of a time entry;

a stop field configured to display an ending time of the time entry;

a description field configured to display a description of the time entry;

at least one code field configured to display a least one code assigned to the time entry;

a selector movable between each of the plurality of fields; and a first actuator configured to perform at least one of a plurality of functions upon being actuated depending upon in which of a plurality of fields the selector is located, wherein the first actuator enters a current system time in the start field when the selector is positioned in the start field.

* * * * *